(12) United States Patent
Clark

(10) Patent No.: US 11,618,973 B2
(45) Date of Patent: Apr. 4, 2023

(54) POLYETHYLENE TEREPHTHALATE COLORING SYSTEMS AND METHODS

(71) Applicant: Aladdin Manufacturing Corporation, Calhoun, GA (US)

(72) Inventor: Thomas R. Clark, Chattanooga, TN (US)

(73) Assignee: Aladdin Manufacturing Corporation, Calhoun, GA (US)

( * ) Notice: Subject to any disclaimer, the term of this patent is extended or adjusted under 35 U.S.C. 154(b) by 0 days.

(21) Appl. No.: 16/645,137

(22) PCT Filed: Sep. 14, 2018

(86) PCT No.: PCT/US2018/051043
§ 371 (c)(1),
(2) Date: Mar. 6, 2020

(87) PCT Pub. No.: WO2019/055762
PCT Pub. Date: Mar. 21, 2019

(65) Prior Publication Data
US 2021/0162631 A1 Jun. 3, 2021

Related U.S. Application Data

(60) Provisional application No. 62/559,443, filed on Sep. 15, 2017.

(51) Int. Cl.
*B29C 48/00* (2019.01)
*D01D 1/06* (2006.01)
(Continued)

(52) U.S. Cl.
CPC ............. *D01D 1/065* (2013.01); *B29B 7/325* (2013.01); *B29B 7/60* (2013.01); *B29B 7/726* (2013.01);
(Continued)

(58) Field of Classification Search
None
See application file for complete search history.

(56) References Cited

U.S. PATENT DOCUMENTS 1,490,918 A 4/1924 Gaede
2,146,532 A 2/1939 Crane
(Continued)

FOREIGN PATENT DOCUMENTS

AU 2013267847 3/2014
AU 2014215998 9/2014
(Continued)

OTHER PUBLICATIONS

Office Action, dated Dec. 17, 2020, from corresponding U.S. Appl. No. 15/910,853.
(Continued)

*Primary Examiner* — Mohammad M Ameen
(74) *Attorney, Agent, or Firm* — Brient IP Law, LLC

(57) ABSTRACT

Method and system for manufacturing bulked continuous filament having tonal coloring from PET comprising: an extruder (202); a static mixing assembly (208) coupled to the extruder and comprising a housing and one or more individual static mixing elements disposed within the housing; the method and system further comprising a plurality of colorant ports along a length of the static mixing assembly such that each of the plurality of colorant ports is configured to provide colorant (204) to a polymer stream at a different location along the length of the static mixing assembly, and one or more spinning machines (212) positioned downstream of the static mixing assembly and coupled to the static mixing assembly to receive the colored polymer stream. The spinning machine(s) may be configured to form the colored polymer stream into bulked continuous carpet filament having a tonal color effect.

20 Claims, 11 Drawing Sheets

(51) Int. Cl.

| | |
|---|---|
| B29C 48/425 | (2019.01) |
| B29B 7/72 | (2006.01) |
| D01F 1/04 | (2006.01) |
| B29C 48/36 | (2019.01) |
| B29B 7/88 | (2006.01) |
| B29B 7/32 | (2006.01) |
| B29B 7/60 | (2006.01) |
| B29C 48/17 | (2019.01) |
| B29B 7/94 | (2006.01) |
| D01D 5/08 | (2006.01) |
| B29K 105/26 | (2006.01) |
| B29B 7/74 | (2006.01) |
| B29C 48/435 | (2019.01) |
| B29K 67/00 | (2006.01) |
| D01F 6/62 | (2006.01) |

(52) U.S. Cl.
CPC ............ B29B 7/88 (2013.01); B29B 7/94 (2013.01); B29C 48/022 (2019.02); B29C 48/17 (2019.02); B29C 48/362 (2019.02); B29C 48/425 (2019.02); D01D 5/08 (2013.01); D01F 1/04 (2013.01); B29B 7/7461 (2013.01); B29B 7/885 (2013.01); B29C 48/435 (2019.02); B29K 2067/003 (2013.01); B29K 2105/26 (2013.01); D01F 6/62 (2013.01); D10B 2331/04 (2013.01); D10B 2503/04 (2013.01)

(56) References Cited

U.S. PATENT DOCUMENTS

| | | |
|---|---|---|
| 3,217,783 A | 11/1965 | Rodenacker |
| 3,310,837 A | 3/1967 | Wittrock |
| 3,357,049 A | 12/1967 | Spindler |
| 3,608,001 A | 9/1971 | Kowalski et al. |
| 3,825,236 A | 7/1974 | Hussmann et al. |
| 3,865,528 A | 2/1975 | Roess |
| 3,938,924 A | 2/1976 | Abella et al. |
| 4,057,376 A | 11/1977 | Berger |
| 4,057,607 A | 11/1977 | Soehngen et al. |
| 4,128,386 A | 12/1978 | Wissinger et al. |
| 4,172,477 A | 10/1979 | Reich |
| 4,192,617 A | 3/1980 | Spielhoff |
| 4,268,176 A | 5/1981 | Muller |
| 4,269,798 A * | 5/1981 | Ives ............ B29B 7/007 264/73 |
| 4,272,475 A | 6/1981 | Chi |
| 4,289,409 A | 9/1981 | Brand |
| 4,370,302 A | 1/1983 | Suzuoka et al. |
| 4,564,349 A | 1/1986 | Brown |
| 4,591,487 A | 5/1986 | Fritsch |
| 4,675,378 A | 6/1987 | Gibbon et al. |
| 4,919,872 A | 4/1990 | Fintel |
| 5,102,594 A | 4/1992 | Burlet et al. |
| 5,108,711 A | 4/1992 | Chszaniecki |
| 5,143,308 A | 9/1992 | Hally et al. |
| 5,224,383 A | 7/1993 | Pinto et al. |
| 5,225,130 A | 7/1993 | Deiringer |
| 5,266,601 A | 11/1993 | Kyber et al. |
| 5,306,803 A | 4/1994 | Arlt et al. |
| 5,339,255 A | 8/1994 | Suzuki et al. |
| 5,393,140 A | 2/1995 | Blach |
| 5,424,013 A | 6/1995 | Lieberman |
| 5,427,881 A | 6/1995 | Sacripante et al. |
| 5,459,168 A | 10/1995 | Nasr et al. |
| 5,497,562 A | 3/1996 | Pikus |
| 5,503,788 A | 4/1996 | Lazareck et al. |
| 5,510,073 A | 4/1996 | Kaegi et al. |
| 5,532,035 A | 7/1996 | Corbin et al. |
| 5,549,957 A | 8/1996 | Negola et al. |
| 5,554,657 A | 9/1996 | Brownscombe et al. |
| 5,613,285 A | 3/1997 | Chester et al. |
| 5,623,012 A | 4/1997 | Hwo |
| 5,715,584 A | 2/1998 | Coons, III et al. |
| 5,804,115 A | 9/1998 | Burton et al. |
| 5,836,682 A | 11/1998 | Blach |
| 5,886,058 A | 3/1999 | Van Erden et al. |
| 5,893,702 A | 4/1999 | Conrad et al. |
| 5,932,691 A | 8/1999 | Khanin et al. |
| 5,945,215 A | 8/1999 | Bersted et al. |
| 5,951,159 A | 9/1999 | Schobert-Csongor et al. |
| 5,958,548 A | 9/1999 | Negola et al. |
| 5,961,054 A | 10/1999 | Nishibori |
| 6,007,892 A | 12/1999 | Harwood et al. |
| 6,074,084 A | 6/2000 | Kolossow |
| 6,113,825 A | 9/2000 | Chuah |
| 6,265,533 B1 | 7/2001 | Regel et al. |
| 6,281,278 B1 | 8/2001 | Takase et al. |
| 6,394,644 B1 | 5/2002 | Streiff |
| 6,492,485 B1 | 12/2002 | Gohr et al. |
| 6,620,354 B1 | 9/2003 | Bessemer et al. |
| 6,627,127 B1 | 9/2003 | Piovoso et al. |
| 6,722,117 B2 | 4/2004 | Belcher, Jr. et al. |
| 6,773,718 B2 | 8/2004 | Seth et al. |
| 6,780,941 B2 | 8/2004 | Studholme et al. |
| 6,784,214 B1 | 8/2004 | Bacher et al. |
| 6,852,256 B2 | 2/2005 | Borer et al. |
| 6,866,171 B2 | 3/2005 | Ickinger |
| 6,984,694 B2 | 1/2006 | Blasius, Jr. et al. |
| 7,025,491 B2 | 4/2006 | Blach et al. |
| 7,192,545 B2 | 3/2007 | Ekart et al. |
| 7,198,400 B2 | 4/2007 | Unterlander et al. |
| 7,204,945 B2 | 4/2007 | Bonner |
| 7,262,380 B1 | 8/2007 | Ulrichsen et al. |
| 7,320,589 B2 | 1/2008 | Babin et al. |
| 7,354,988 B2 | 4/2008 | Charati et al. |
| 7,380,973 B2 | 6/2008 | Goedicke et al. |
| 7,485,685 B2 | 2/2009 | Mihan et al. |
| 7,513,677 B2 | 4/2009 | Gneuss et al. |
| 7,594,453 B2 | 9/2009 | Blach |
| 7,628,892 B2 | 12/2009 | Fini |
| 7,647,886 B2 | 1/2010 | Kubista et al. |
| 7,654,725 B2 | 2/2010 | Sturm et al. |
| 7,700,015 B2 | 4/2010 | Kern et al. |
| 7,744,788 B2 | 6/2010 | Portier et al. |
| 7,799,835 B2 | 9/2010 | Smith et al. |
| 7,828,538 B2 | 11/2010 | Fellinger |
| 7,902,262 B2 | 3/2011 | Armstrong et al. |
| 7,928,150 B2 | 4/2011 | Kannan et al. |
| 7,935,737 B2 | 5/2011 | Gopal et al. |
| 7,980,834 B2 | 7/2011 | Maguire |
| 8,080,190 B2 | 12/2011 | Ichikawa et al. |
| 8,147,738 B2 | 4/2012 | Boczon et al. |
| 8,187,512 B2 | 5/2012 | Eloo et al. |
| 8,398,752 B2 | 3/2013 | Brownstein et al. |
| 8,404,755 B2 | 3/2013 | Sequeira |
| 8,444,886 B2 | 5/2013 | Herve |
| 8,471,972 B2 | 6/2013 | Tsubata |
| 8,557,155 B2 | 10/2013 | Deiss et al. |
| 8,597,553 B1 * | 12/2013 | Clark ............ D01F 6/62 264/40.1 |
| 8,735,457 B2 | 5/2014 | Booth et al. |
| 8,741,972 B2 | 6/2014 | Booth et al. |
| 8,795,811 B2 | 8/2014 | Cloutier et al. |
| 9,061,442 B2 | 6/2015 | Gneuss et al. |
| 9,149,955 B2 | 10/2015 | Bower et al. |
| 9,168,718 B2 | 10/2015 | Westwood et al. |
| 9,409,363 B2 | 8/2016 | Clark |
| 9,550,338 B2 | 1/2017 | Clark |
| 9,630,353 B2 | 4/2017 | Clark |
| 9,630,354 B2 | 4/2017 | Clark |
| 9,636,845 B2 | 5/2017 | Clark |
| 9,636,860 B2 | 5/2017 | Clark |
| 9,908,263 B2 | 3/2018 | Pichler et al. |
| 9,975,278 B2 | 5/2018 | Rabiser et al. |
| 10,124,513 B2 | 11/2018 | Clark |
| 10,532,495 B2 | 1/2020 | Clark |
| 2002/0086077 A1 | 7/2002 | Noller et al. |
| 2004/0053047 A1 | 3/2004 | Jackson et al. |
| 2004/0063860 A1 | 4/2004 | Marston et al. |
| 2004/0082672 A1 | 4/2004 | Zeng et al. |

(56) References Cited

U.S. PATENT DOCUMENTS

| | | | |
|---|---|---|---|
| 2004/0140248 A1 | 7/2004 | Dauzvardis et al. | |
| 2004/0155374 A1 | 8/2004 | Hutchinson et al. | |
| 2005/0047267 A1 | 3/2005 | Gneuss et al. | |
| 2005/0263941 A1 | 12/2005 | Reutter et al. | |
| 2006/0012074 A1 | 1/2006 | Booth et al. | |
| 2006/0076705 A1 | 4/2006 | Fowler et al. | |
| 2006/0284334 A1 | 12/2006 | Christel | |
| 2007/0000947 A1* | 1/2007 | Lewis | B01F 13/1055 222/132 |
| 2007/0009750 A1 | 1/2007 | Ito et al. | |
| 2007/0052131 A1 | 3/2007 | Fujimaki et al. | |
| 2007/0261777 A1 | 11/2007 | Steckelberg et al. | |
| 2008/0004202 A1 | 1/2008 | Wolfgang et al. | |
| 2008/0069916 A1 | 3/2008 | Regalia | |
| 2008/0139700 A1 | 6/2008 | Roden et al. | |
| 2008/0157425 A1 | 7/2008 | Rodgers et al. | |
| 2008/0214701 A1 | 9/2008 | Wilms et al. | |
| 2008/0272508 A1 | 11/2008 | Culbert et al. | |
| 2008/0274320 A1 | 11/2008 | Yokoyama et al. | |
| 2008/0292831 A1 | 11/2008 | Juriga et al. | |
| 2009/0004325 A1 | 1/2009 | Bacher et al. | |
| 2009/0039542 A1 | 2/2009 | Morton-Finger | |
| 2009/0270564 A1 | 10/2009 | Gorlier et al. | |
| 2009/0286919 A1 | 11/2009 | Moeller et al. | |
| 2010/0102475 A1 | 4/2010 | Moon et al. | |
| 2010/0113626 A1 | 5/2010 | Liu | |
| 2011/0177283 A1 | 7/2011 | Juriga | |
| 2011/0257345 A1 | 10/2011 | Hoover, Jr. et al. | |
| 2012/0070615 A1 | 3/2012 | Shi et al. | |
| 2012/0279023 A1 | 11/2012 | Burout et al. | |
| 2013/0133697 A1 | 5/2013 | Stockman et al. | |
| 2015/0069652 A1 | 3/2015 | Clark | |
| 2015/0069655 A1 | 3/2015 | Clark | |
| 2015/0076725 A1 | 3/2015 | Clark | |
| 2015/0076744 A1 | 3/2015 | Clark | |
| 2017/0136761 A1 | 5/2017 | Sieradzki et al. | |
| 2017/0152611 A1 | 6/2017 | Clark | |
| 2017/0275785 A1 | 9/2017 | Williams et al. | |
| 2018/0126595 A1 | 5/2018 | Clark | |
| 2018/0127893 A1 | 5/2018 | Clark | |
| 2018/0362723 A1 | 12/2018 | Gneuss et al. | |
| 2020/0055213 A1 | 2/2020 | Clark | |

FOREIGN PATENT DOCUMENTS

| | | | |
|---|---|---|---|
| CH | 170967 A | | 8/1934 |
| CN | 1391511 | | 1/2003 |
| CN | 101444954 | | 6/2009 |
| CN | 101778705 | | 7/2010 |
| CN | 201872322 | | 6/2011 |
| CN | 202072825 | | 12/2011 |
| CN | 102990903 | | 3/2013 |
| CN | 202986059 U | | 6/2013 |
| CN | 104040040 | | 9/2014 |
| CN | 204265905 | | 4/2015 |
| CN | 204265905 U | * | 4/2015 |
| DE | 2243024 A1 | | 3/1973 |
| DE | 3801574 | | 8/1989 |
| DE | 4433593 | | 6/1995 |
| DE | 19722278 | | 12/1998 |
| DE | 102006033089 | | 10/2007 |
| DE | 102008018686 | | 10/2009 |
| DE | 102011082769 | | 3/2013 |
| DE | 102013000316 | | 7/2014 |
| DE | 102017111275 | | 11/2018 |
| EP | 0336520 | | 10/1989 |
| EP | 0846860 A2 | | 6/1998 |
| EP | 0881054 | | 12/1998 |
| EP | 1054083 | | 11/2000 |
| EP | 1400332 | | 3/2004 |
| EP | 1434680 B1 | | 7/2006 |
| EP | 2748358 | | 7/2014 |
| EP | 3375916 | | 9/2018 |
| GB | 2059864 | | 4/1981 |
| GB | 1601699 | | 11/1981 |
| GB | 2141844 | | 1/1985 |
| JP | 63191823 | | 8/1988 |
| JP | 2003530478 | | 10/2003 |
| JP | 2007186830 | | 7/2007 |
| WO | 2001021373 | | 3/2001 |
| WO | 2002038276 | | 5/2002 |
| WO | 2003033240 | | 4/2003 |
| WO | 2004/026557 | | 4/2004 |
| WO | 2008017843 | | 2/2008 |
| WO | 2008083035 | | 7/2008 |
| WO | 2008083820 | | 7/2008 |
| WO | 2010133531 | | 11/2010 |
| WO | 2011088437 | | 7/2011 |
| WO | 2011095361 | | 8/2011 |
| WO | 2012119165 | | 9/2012 |
| WO | 2013180941 | | 12/2013 |
| WO | 2016081474 | | 5/2016 |
| WO | 2016081495 | | 5/2016 |
| WO | 2016081508 | | 5/2016 |
| WO | 2016081568 | | 5/2016 |
| WO | 2018089346 | | 5/2018 |
| WO | 2018140884 | | 8/2018 |
| WO | 2018161021 | | 9/2018 |

OTHER PUBLICATIONS

Final Office Action, dated Dec. 31, 2020, from corresponding U.S. Appl. No. 16/348,117.
Office Action, dated Jan. 8, 2021, from corresponding U.S. Appl. No. 16/557,076.
Notice of Allowance, dated Jan. 13, 2021, from corresponding U.S. Appl. No. 16/537,844.
Notice of Allowance, dated Apr. 17, 2019, from corresponding U.S. Appl. No. 16/220,733.
Notice of Allowance, dated Aug. 1, 2019, from corresponding U.S. Appl. No. 15/396,143.
Notice of Allowance, dated Aug. 19, 2019, from corresponding U.S. Appl. No. 16/402,583.
Notice of Allowance, dated Dec. 13, 2018, from corresponding U.S. Appl. No. 15/473,385.
Notice of Allowance, dated Feb. 12, 2020, from corresponding U.S. Appl. No. 16/220,905.
Notice of Allowance, dated Feb. 2, 2017, from corresponding U.S. Appl. No. 14/546,819.
Notice of Allowance, dated Feb. 2, 2017, from corresponding U.S. Appl. No. 14/546,837.
Notice of Allowance, dated Feb. 2, 2017, from corresponding U.S. Appl. No. 14/546,847.
Notice of Allowance, dated Feb. 3, 2017, from corresponding U.S. Appl. No. 14/546,796.
Notice of Allowance, dated Feb. 3, 2020, from corresponding U.S. Appl. No. 16/041,442.
Notice of Allowance, dated Jan. 24, 2019, from corresponding U.S. Appl. No. 15/473,402.
Notice of Allowance, dated Jul. 5, 2018, from corresponding U.S. Appl. No. 15/204,645.
Notice of Allowance, dated May 1, 2019, from corresponding U.S. Appl. No. 15/419,955.
Notice of Allowance, dated Oct. 10, 2019, from corresponding U.S. Appl. No. 16/432,579.
Notice of Allowance, dated Oct. 28, 2013, from corresponding U.S. Appl. No. 13/721,955.
Notice of Allowance, dated Sep. 12, 2016, from corresponding U.S. Appl. No. 13/892,713.
Notice of Opposition, dated Dec. 17, 2015, from corresponding European Application No. 13728264.6.
Office Action, dated Apr. 9, 2018, from corresponding U.S. Appl. No. 15/204,645.
Office Action, dated Aug. 13, 2019, from corresponding U.S. Appl. No. 16/213,694.
Office Action, dated Aug. 21, 2015, from corresponding U.S. Appl. No. 14/256,261.

(56) References Cited

OTHER PUBLICATIONS

Office Action, dated Aug. 26, 2019, from corresponding U.S. Appl. No. 16/220,905.
Office Action, dated Aug. 27, 2018, from corresponding U.S. Appl. No. 15/473,385.
Office Action, dated Aug. 27, 2018, from corresponding U.S. Appl. No. 15/473,402.
Office Action, dated Aug. 8, 2019, from corresponding U.S. Appl. No. 16/409,599.
Office Action, dated Dec. 2, 2019, from corresponding U.S. Appl. No. 16/664,730.
Office Action, dated Feb. 21, 2020, from corresponding U.S. Appl. No. 15/910,853.
Office Action, dated Jan. 29, 2020, from corresponding U.S. Appl. No. 16/684,490.
Office Action, dated Jul. 23, 2019, from corresponding U.S. Appl. No. 16/041,442.
Office Action, dated Jun. 1, 2016, from corresponding U.S. Appl. No. 14/546,837.
Office Action, dated Jun. 10, 2013, from corresponding U.S. Appl. No. 13/721,955.
Office Action, dated Jun. 13, 2016, from corresponding U.S. Appl. No. 14/546,847.
Office Action, dated Jun. 18, 2019, from corresponding U.S. Appl. No. 16/402,583.
Office Action, dated Jun. 22, 2016, from corresponding U.S. Appl. No. 14/546,796.
Office Action, dated Jun. 30, 2016, from corresponding U.S. Appl. No. 13/892,740.
Office Action, dated Mar. 24, 2016, from corresponding U.S. Appl. No. 13/892,713.
Office Action, dated May 26, 2016, from corresponding U.S. Appl. No. 14/546,819.
Office Action, dated May 6, 2019, from corresponding U.S. Appl. No. 15/348,591.
Office Action, dated Nov. 25, 2019, from corresponding U.S. Appl. No. 15/804,501.
Office Action, dated Nov. 29, 2019, from corresponding U.S. Appl. No. 16/557,076.
Office Action, dated Oct. 9, 2018, from corresponding U.S. Appl. No. 15/419,955.
Office Action, dated Sep. 12, 2019, from corresponding U.S. Appl. No. 16/432,579.
Office Action, dated Sep. 7, 2018, from corresponding U.S. Appl. No. 15/396,143.
Restriction Requirement, dated Apr. 30, 2013, from corresponding U.S. Appl. No. 13/721,955.
Restriction Requirement, dated Feb. 5, 2019, from corresponding U.S. Appl. No. 16/220,733.
Restriction Requirement, dated Jul. 15, 2019, from corresponding U.S. Appl. No. 16/432,579.
Schiefer,Process Engineering, Rowohlt Taschenbuch Verlag GmbH, Aug. 1972.
Vietnamese Office Action, dated Jul. 13, 2016, from corresponding Vietnamese Patent Application No. 1-2014-01079.
Wikipedia, Polyethylene terephthalate, https://en.wikipedia.org/w/index.php?title=Polyethylene_terephthalate&oldid=491494734.
Written Opinion of the International Searching Authority, dated Apr. 12, 2018, from corresponding International Application No. PCT/US2018/015751.
Written Opinion of the International Searching Authority, dated Dec. 10, 2019, from corresponding International Application No. PCT/US2019/042458.
International Preliminary Report on Patentability, dated Feb. 4, 2021, from corresponding International Application No. PCT/US2019/042456.
International Preliminary Report on Patentability, dated Feb. 4, 2021, from corresponding International Application No. PCT/US2019/042458.
Office Action, dated Feb. 12, 2021, from corresponding U.S. Appl. No. 16/480,302.
Final Office Action, dated Jun. 11, 2020, from corresponding U.S. Appl. No. 15/804,501.
Final Office Action, dated Jun. 11, 2020, from corresponding U.S. Appl. No. 16/409,599.
Gneuss website, https://www.gneuss.com/en/polymer-technologies/extrusion/mrs-extruder/, dated Jun. 5, 2020, pp. 1-4.
Final Office Action, dated Jun. 15, 2020, from corresponding U.S. Appl. No. 16/557,076.
Office Action, dated Jun. 24, 2020, from corresponding U.S. Appl. No. 16/348,117.
European Search Report, dated Apr. 28, 2020, from corresponding European Application No. 17869117.6.
Final Office Action, dated Sep. 28, 2020, from corresponding U.S. Appl. No. 16/131,397.
Notice of Allowance, dated Feb. 25, 2021, from corresponding U.S. Appl. No. 16/664,724.
Office Action, dated Mar. 1, 2021, from corresponding U.S. Appl. No. 16/131,397.
International Search Report, dated Sep. 3, 2020, from corresponding International Application No. PCT/US2020/036094.
Written Opinion of the International Searching Authority, dated Sep. 3, 2020, from corresponding International Application No. PCT/US2020/036094.
Office Action, dated Sep. 1, 2020, from corresponding U.S. Appl. No. 16/537,844.
Final Office Action, dated Jul. 8, 2020, from corresponding U.S. Appl. No. 15/910,853.
Restriction Requirement, dated Jul. 1, 2020, from corresponding U.S. Appl. No. 16/041,586.
Advisory Action, dated Apr. 9, 2021, from corresponding U.S. Appl. No. 16/348,117.
Final Office Action, dated Apr. 27, 2021, from corresponding U.S. Appl. No. 15/910,853.
Office Action, dated May 4, 2021, from corresponding U.S. Appl. No. 16/409,599.
Restriction Requirement, dated May 17, 2021, from corresponding U.S. Appl. No. 16/514,898.
Final Office Action, dated May 25, 2021, from corresponding U.S. Appl. No. 16/480,302.
Notice of Allowance, dated Jun. 23, 2021, from corresponding U.S. Appl. No. 16/557,076.
Office Action, dated Jun. 18, 2021, from corresponding U.S. Appl. No. 16/348,117.
Office Action, dated Jun. 2, 2021, from corresponding U.S. Appl. No. 16/514,903.
Office Action, dated Oct. 27, 2020, from corresponding U.S. Appl. No. 16/409,599.
Restriction Requirement, dated Oct. 20, 2020, from corresponding U.S. Appl. No. 16/480,302.
Office Action, dated Nov. 2, 2020, from corresponding U.S. Appl. No. 15/804,501.
Office Action, dated Nov. 18, 2020, from corresponding U.S. Appl. No. 16/664,724.
Office Action, dated Jun. 25, 2021, from corresponding U.S. Appl. No. 16/489,875.
Office Action, dated Jun. 25, 2021, from corresponding U.S. Appl. No. 16/816,409.
Final Office Action, dated Jul. 30, 2021, from corresponding U.S. Appl. No. 15/910,853.
Office Action, dated Aug. 6, 2021, from corresponding U.S. Appl. No. 16/518,261.
Written Opinion of the International Searching Authority, dated Feb. 2, 2016, from corresponding International Application No. PCT/US2015/061116.
Written Opinion of the International Searching Authority, dated Feb. 2, 2016, from corresponding International Application No. PCT/US2015/061145.
Written Opinion of the International Searching Authority, dated Feb. 5, 2016, from corresponding International Application No. PCT/US2015/061174.

(56) References Cited

OTHER PUBLICATIONS

Written Opinion of the International Searching Authority, dated Jan. 20, 2016, from corresponding International Application No. PCT/US2015/061288.
Written Opinion of the International Searching Authority, dated Mar. 1, 2018, from corresponding International Application Serial No. PCT/US2017/060359.
Written Opinion of the International Searching Authority, dated Nov. 19, 2018, from corresponding International Application No. PCT/US2018/051043.
Written Opinion of the International Searching Authority, dated Oct. 30, 2019, from corresponding International Application No. PCT/US2019/042456.
Written Opinion of the International Searching Authority, dated Sep. 2, 2013, from corresponding International Application No. PCT/US2013/040753.
Notice of Allowance, dated Feb. 28, 2020, from corresponding U.S. Appl. No. 16/664,730.
Notice of Allowance, dated Mar. 3, 2020, from corresponding U.S. Appl. No. 16/213,694.
International Preliminary Report on Patentability, dated Mar. 26, 2020, from corresponding International Application No. PCT/US2018/051043.
Notice of Allowance, dated Apr. 9, 2020, from corresponding U.S. Appl. No. 16/684,490.
"MRS extrusion technology offers new options in PET", Plastics Additives and Compounding, Elsevier Science, Oxofrd, GB, vol. 11, No. 2, Mar. 1, 2009 (Mar. 1, 2009), pp. 24-26, XP026067788, ISSN: 1464-391X. DOI:10.1016/S1464-391X(09)70050-9 [retrieved on Mar. 1, 2009] the whole document.
"Processing Technology: Processing of Polymer Melts," Oct. 31, 2007, Gneuss Kunststofftechnik GmbH, Dusseldorf, Germany.
Australian Office Action, dated Aug. 26, 2015, from corresponding Australian Patent Application No. 2014215998.
Australian Office Action, dated Dec. 5, 2016, from corresponding Australian Patent Application No. 2016234917.
Australian Office Action, dated May 9, 2014, from corresponding Australian Patent Application No. 2013267847.
Austrian Patent Application No. A 330/2011, filed Mar. 10, 2011, entitled "Verfahren und Vorrichtung zum Entfernen von Verunreinigungen aus einer Kunststoffschmelze".
Botos, J., et al., "Color Measurement of Plastics—from Compounding via Pelletizing, up to Injection Molding and Extrusion," AIP Conference Proceedings 1593, 16 (2014), https://doi.org/10.1063/1.4873725, Feb. 17, 2015.
Chinese Office Action, dated May 12, 2016, from corresponding Chinese Patent Application No. 201380003461.8.
Chinese Office Action, dated Sep. 14, 2015, from corresponding Chinese Patent Application No. 201380003461.8.
Decision of Patent Grant, dated Dec. 12, 2014, from corresponding Korean Patent Application No. 10-2014-7016621.
European Office Action, dated Dec. 12, 2016, from corresponding European Patent Application No. 15158377.0.
Ex Parte Quayle Action, dated Mar. 11, 2019, from corresponding U.S. Appl. No. 16/220,733.
Extended European Search Report, dated Aug. 26, 2015, from corresponding European Application No. 15158377.0.
Extended European Search Report, dated Jul. 24, 2018, from corresponding European Patent Application No. 181701129.
Final Office Action, dated Dec. 24, 2015, from corresponding U.S. Appl. No. 14/256,261.
Final Office Action, dated Jan. 9, 2020, from corresponding U.S. Appl. No. 15/348,591.
Final Office Action, dated May 22, 2019, from corresponding U.S. Appl. No. 15/396,143.
Final Office Action, dated Oct. 19, 2016, from corresponding U.S. Appl. No. 14/546,819.
Final Office Action, dated Oct. 19, 2016, from corresponding U.S. Appl. No. 14/546,837.
Final Office Action, dated Oct. 19, 2016, from corresponding U.S. Appl. No. 14/546,847.
Final Office Action, dated Oct. 20, 2016, from corresponding U.S. Appl. No. 14/546,796.
Gneuss M: "Multi Rotation System Extruder Leads to Breakthrough in Polymer Evacuation", International Fiber Journal, International Media Group, Charlotte, NC, US, vol. 23, No. 1, Feb. 1, 2008 (Feb. 1, 2008), pp. 40-41, XP001514827, ISSN: 1049-801X the whole document.
Hannemann, Innovative Aufbereitungslosung für PET mit uneingeschränkter FDA—Lebensmittelzulassung, Presentation, Mar. 15, 2012, 37 pages total, Gneuss Kunststofftechnik GmbH, Germany.
International Preliminary Report on Patentability, dated Aug. 8, 2019, from corresponding International Application No. PCT/US2018/015751.
International Preliminary Report on Patentability, dated Dec. 11, 2014, from corresponding International Application No. PCT/US2013/040753.
International Preliminary Report on Patentability, dated Dec. 2, 2014, from corresponding International Application No. PCT/US2013/040753.
International Preliminary Report on Patentability, dated Jun. 1, 2017, from corresponding International Application No. PCT/US2015/061116.
International Preliminary Report on Patentability, dated Jun. 1, 2017, from corresponding International Application No. PCT/US2015/061145.
International Preliminary Report on Patentability, dated Jun. 1, 2017, from corresponding International Application No. PCT/US2015/061174.
International Preliminary Report on Patentability, dated Jun. 1, 2017, from corresponding International Application No. PCT/US2015/061288.
International Preliminary Report on Patentability, dated Sep. 12, 2019, from corresponding International Application No. PCT/US2018/020746.
International Search Report, dated Apr. 12, 2018, from corresponding International Application No. PCT/US2018/015751.
International Search Report, dated Dec. 10, 2019, from corresponding International Application No. PCT/US2019/042458.
International Search Report, dated Feb. 2, 2016, from corresponding International Application No. PCT/US2015/061116.
International Search Report, dated Feb. 2, 2016, from corresponding International Application No. PCT/US2015/061145.
International Search Report, dated Feb. 5, 2016, from corresponding International Application No. PCT/US2015/061174.
International Search Report, dated Jan. 20, 2016, from corresponding International Application No. PCT/US2015/061288.
International Search Report, dated Jul. 5, 2012, from corresponding International Application No. PCT/AT2012/000052.
International Search Report, dated Mar. 1, 2018, from corresponding International Application Serial No. PCT/US2017/060359.
International Search Report, dated Nov. 19, 2018, from corresponding International Application No. PCT/US2018/051043.
International Search Report, dated Oct. 30, 2019, from corresponding International Application No. PCT/US2019/042456.
International Search Report, dated Sep. 2, 2013, from corresponding International Application No. PCT/US2013/040753.
Invitation to Pay Additional Fees, dated Oct. 18, 2019, from corresponding International Application No. PCT/US2019/042458.
Invitation to Pay Additional Search Fees, dated Jan. 5, 2018, from corresponding International Application Serial No. PCT/US2017/060359.
Jaecker M: "The Conceptual Concept of the Future // Advantages of the Negative-Conical Gangti EFE on Double-Screw Extruders", Kunststoffe, Carl Hanser Verlag, Munchen, DE, vol. 99, No. 12, Dec. 1, 2000 (Dec. 1, 2000), p. 64,66, XP990976191, ISSN: 9923-5563, figure 1.
Korean Office Action, dated Aug. 18, 2014, from corresponding Korean Patent Application No. 10-2014-7016621.

(56) References Cited

OTHER PUBLICATIONS

Machado, Almir De Souza, "Fundamentals of Cast Film Extrusion Technology," https://www.slideshare.net/ASMachado/fundamentals-of-cast-film-extrusion-technology, Dec. 2, 2013.
Notice of Acceptance, dated Jun. 21, 2016, from corresponding Australian Patent Application No. 2014215998.
Notice of Acceptance, dated Nov. 10, 2014, from corresponding Australian Patent Application No. 2013267847.
Notice of Allowance, dated Apr. 13, 2016, from corresponding U.S. Appl. No. 14/256,261.
Notice of Allowance, dated Apr. 29, 2020, from corresponding U.S. Appl. No. 15/348,591.
Office Action, dated May 27, 2020, from corresponding U.S. Appl. No. 16/131,397.
Final Office Action, dated Dec. 6, 2021, from corresponding U.S. Appl. No. 16/348,117.
Notice of Allowance, dated Jan. 20, 2022, from corresponding U.S. Appl. No. 16/131,397.
Final Office Action, dated Sep. 14, 2021, from corresponding U.S. Appl. No. 16/409,599.
Final Office Action, dated Sep. 7, 2021, from corresponding U.S. Appl. No. 16/131,397.
Notice of Allowance, dated Sep. 22, 2021, from corresponding U.S. Appl. No. 16/514,903.
Final Office Action, dated Oct. 4, 2021, from corresponding U.S. Appl. No. 16/480,302.
Office Action, dated Oct. 6, 2021, from corresponding U.S. Appl. No. 16/489,875.

\* cited by examiner

POLYETHYLENE TEREPHTHALATE COLORING SYSTEMS AND METHODS

BACKGROUND

Currently, many different carpet designs are available. However, it is difficult, using traditional manufacturing processes, to cost-effectively produce small, customized runs of broadloom carpet because doing so typically requires small amounts of BCF yarns to be produced in dedicated colors. Producing small amounts of BCF yarns in dedicated colors is typically expensive because changing a traditional BCF production line from one color to another may require shutting down the line and/or running the line to produce an undesired color (which may ultimately be discarded as waste) while the line is transitioning from one color to the next.

It is also currently difficult to produce a substantially uniform-looking "tonal" effect in broadloom carpets in which the individual strands of BCF include multiple different tones of the same color or colors, and in which the various tones of the same color(s) are maintained in the same or similar approximate proportions over the length of the individual strands of BCF (e.g., so that the resulting carpet includes an overall, uniform-appearing coloring comprising different tones of the same color(s)).

Accordingly, there is currently a need for improved processes for producing small, customized runs of broadloom carpet, especially where the individual strands of BCF are colored to produce a tonal effect. There is a further need for processes that allow for creating different tonal effects (which may, for example, be customized according to customer requests) and for manufacturing BCF for such carpet from recycled material, such as recycled plastic bottles.

SUMMARY

In various embodiments, a method of manufacturing bulked continuous carpet filament having a tonal color effect from polyethylene terephthalate (PET) using an extruder is provided. According to the method, an extruder (e.g., a multi-screw extruder, such as an MRS machine) at least partially melts the PET into a polymer melt and at least partially purifies the polymer melt to create a polymer stream. The polymer stream enters a static mixing assembly having one or more individual static mixing elements (e.g., at least thirty individual static mixing elements) at an upstream end and exits at a downstream end. One or more colorant ports positioned along a length of the static mixing assembly provide colorant to the polymer stream at any of a plurality of different locations along the length of the static mixing assembly. In a particular embodiment, a plurality of colorant ports are provided—each at different lengths from the downstream end of the static mixing assembly, and a user may select which colorant port to inject colorant through. After mixing the polymer stream with the colorant within the static mixing assembly, the polymer stream is formed into bulked continuous carpet filament having a tonal color effect. In particular embodiments, the tonal color effect varies based on which colorant port is selected to deliver the colorant into the polymer stream (e.g., because the colorant will generally mix with the polymer stream to a different extent based on the number of static mixing elements that the colorant/polymer mixture passes through).

So, according to a first embodiment of the invention, a method of manufacturing a bulked continuous carpet filament from polyethylene terephthalate (PET) having a tonal color effect is provided, the method comprising the steps of:
  providing an extruder;
  using the extruder to at least partially melt the PET into a polymer melt and at least partially purifying the polymer melt to create a polymer stream;
  providing a static mixing assembly comprising one or more individual static mixing elements that are aligned to form a central passageway for the polymer stream to pass through such that the polymer stream enters an upstream end of the static mixing assembly and exits a downstream end of the static mixing assembly, and is mixed by the one or more individual static mixing elements between the upstream end and the downstream end of the static mixing assembly;
  providing a plurality of colorant ports positioned along a length of the static mixing assembly from the upstream end to the downstream end such that each of the plurality of colorant ports is configured to provide colorant to the polymer stream at a different location along the length of the static mixing assembly;
  using the static mixing assembly to mix the polymer stream with the colorant provided at a colorant port from a position of the colorant port to the downstream end of the static mixing assembly; and
  after using the static mixing assembly to mix the polymer stream with the colorant, forming the polymer stream into bulked continuous carpet filament having a tonal color effect.

According to some embodiments, the method may further comprise the steps of:
  injecting the colorant into a colorant port proximate to the downstream end of the static mixing assembly; and
  receiving the polymer stream at a spinning machine from the downstream end of the static mixing assembly having a tonal color effect resulting from non-uniform mixing of the colorant with the polymer stream within the static mixing assembly.

According to some embodiments, the colorant port may be positioned to inject colorant into the static mixing assembly two to four static mixing elements from the downstream end of the static mixing assembly.

According to some embodiments, the colorant port may comprise a first colorant port, and the tonal color effect of the polymer stream received at the spinning machine resulting from the colorant injected into the first colorant port may comprise a first tonal color effect, and the method may further comprise:
  stopping the injection of the colorant into the first colorant port; and
  injecting the colorant into a second colorant port at a location along the length of the static mixing assembly upstream of the first colorant port to create a polymer stream having a second tonal color effect that is less pronounced than the first tonal color effect due to an increased mixing length from the second colorant port to the downstream end of the static mixing assembly as compared to a mixing length from the first colorant port to the downstream end of the static mixing assembly.

According to some embodiments, the colorant port may comprise a first colorant port, and the method may further comprise:
  stopping the injection of the colorant into the first colorant port; and
  injecting the colorant into a second colorant port at a location along the length of the static mixing assembly proximate to the upstream end of the static mixing assembly to substantially thoroughly mix the polymer stream with the colorant to change the tonal color effect of the polymer stream to a polymer stream having a substantially uniform color.

According to some embodiments, the method may further comprise:
providing a plurality of colorant containers coupled to the plurality of colorant ports; and
injecting a plurality of colorant into the polymer stream at the plurality of locations along the length of the static mixing assembly.

According to some embodiments, the plurality of colorant ports each may comprise quick-disconnect coupling mechanisms configured to allow for the installation and de-installation of a colorant container while the polymer stream traverses through the static mixing assembly.

According to some embodiments, the method further may comprise splitting the polymer stream into a plurality of individual polymer streams downstream from the extruder and the static mixing assembly may comprise a static mixing assembly for each of the plurality of individual polymer streams such that each of the plurality of individual polymer streams forms into bulked continuous carpet filament having a tonal color effect.

According to some embodiments, the extruder may be a multi-screw extruder.

According to some embodiments, the static mixing assembly may comprise a substantially cylindrical housing encompassing the one or more individual static mixing elements.

According to some embodiments, the one or more individual static mixing elements may comprise at least thirty individual static mixing elements.

According to some embodiments, the one or more individual static mixing elements may comprise thirty-six to forty individual static mixing elements.

According to some embodiments, the one or more individual static mixing elements may comprise at least five individual static mixing elements arranged consecutively in series, and the plurality of colorant ports may comprise at least one colorant port corresponding to each of the at least five individual static mixing elements.

According to some embodiments, the one or more individual static mixing elements may comprise at least ten individual static mixing elements, and the plurality of colorant ports may comprise at least one respective colorant port corresponding to each respective one of the at least ten individual static mixing elements.

According to some embodiments, the one or more individual static mixing elements may comprise at least two individual static mixing elements arranged in series, wherein each of the at least two individual static mixing elements comprise:
a housing; and
one or more mixing bars or one or more helical mixing elements.

According to a second embodiment of the invention, a system for manufacturing a bulked continuous carpet filament from polyethylene terephthalate (PET) having a tonal color is provided. In this embodiment, the system comprises:
an extruder configured to at least partially melt the PET into a polymer melt and at least partially purify the polymer melt to create a polymer stream;
a static mixing assembly positioned downstream of the extruder and fluidly coupled to the extruder to receive the polymer stream and to create a colored polymer stream, each of the static mixing assemblies comprising: (a) a housing, and (b) one or more individual static mixing elements disposed within the housing such that the polymer stream enters an upstream end of the static mixing assembly and exits a downstream end of the static mixing assembly;
a plurality of colorant ports along a length of the static mixing assembly from the upstream end to the downstream end such that each of the plurality of colorant ports is configured to provide colorant to the polymer stream at a different location along the length of the static mixing assembly; and
one or more spinning machines positioned downstream of the static mixing assembly and fluidly coupled to the static mixing assembly to receive the colored polymer stream, the one or more spinning machines configured to form the colored polymer stream into bulked continuous carpet filament having a tonal color effect.

According to some embodiments, the plurality of colorant ports may comprise:
a first colorant port positioned proximate to the upstream end of the static mixing assembly such that colorant injected through the first colorant port is uniformly mixed over the length of the static mixing assembly to create a uniformly-colored characteristic of the colored polymer stream; and
a second colorant port positioned downstream of the first colorant port such that colorant injected through the second colorant port mixes with the polymer stream for a distance shorter than the length of the static mixing assembly to create a tonal effect characteristic of the colored polymer stream.

According to some embodiments, the system further may comprise one or more colorant containers coupled to the one or more colorant ports.

According to some embodiments, the one or more colorant containers are coupled to the one or more colorant ports via quick-disconnect coupling mechanisms configured to allow for the installation and de-installation of a colorant container while the polymer stream traverses through the static mixing assembly.

According to some embodiments, the static mixing assembly may comprise a plurality of static mixing assemblies, each static mixing assembly receiving an individual polymer stream of a plurality of individual polymer streams split from the polymer stream downstream of the extruder.

According to some embodiments, one or more colorant ports may be positioned to inject colorant into the static mixing assembly two to four static mixing elements from the downstream end of the static mixing assembly.

According to some embodiments, one or more colorant ports may be positioned to inject colorant into the static mixing assembly at different positions around a circumference of the static mixing assembly.

The system according the second aspect of the invention may be fit for, and hence may be used to execute a method according to the first aspect of the invention.

The methods and systems according to various embodiments of the invention may provide the advantage of enabling unique carpet designs to be made (e.g., at a reasonable cost). The methods and systems may have the further advantage of allowing for the efficient production of tonally-colored BCF in small batches (which may be customized, for example, according to a particular customer's preferences), which may allow for the production of small quantities of carpet to be produced having unique, potentially customized, tonal coloring.

Accordingly, methods and systems according to various embodiments of the invention may have the further advantage of producing BCF for use in broadloom carpets that results in a substantially uniform-looking "tonal" effect in the carpets. In various embodiments, the individual strands of BCF include multiple different tones of the same color or colors, and the various tones of the same color or colors may be maintained in the same or similar approximate proportions over the length of the individual strands of BCF (e.g., so that the resulting carpet includes an overall, uniform-appearing coloring comprising different tones of the same color or colors). Various embodiments allow for the production of BCF for use in such carpets from recycled material, such as recycled plastic bottles and/or virgin material.

The independent and dependent claims below set out particular and preferred features of the invention. Features from the dependent claims may be combined with features of the independent or other dependent claims, and/or with features set out in the description above and/or hereinafter as appropriate.

The above and other characteristics, features and advantages of the present invention will become apparent from the following detailed description, taken in conjunction with the accompanying drawings, which illustrate, by way of example, the principles of various embodiments of the invention. This description is given for the purposes of example only, without limiting the scope of the invention. The reference figures numbers referenced below refer to the attached drawings.

BRIEF DESCRIPTION OF THE DRAWINGS

Having described various embodiments in general terms, reference will now be made to the accompanying drawings, which are not necessarily drawn to scale, and wherein.

Figure 1:
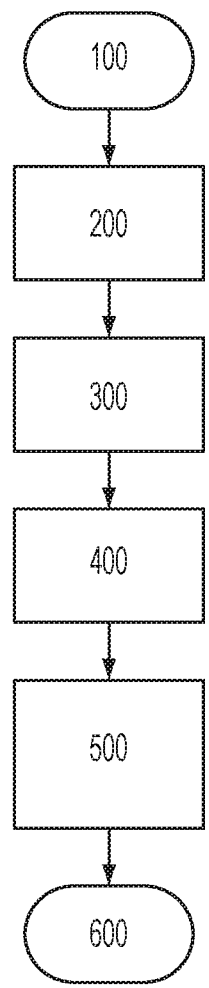
FIG. 1 depicts a high-level overview of a manufacturing process for producing and coloring bulked continuous filament.

Within the figures, the same reference signs refer to the same, similar or analogous elements within the various figures.

DETAILED DESCRIPTION OF VARIOUS EMBODIMENTS

Various embodiments will now be described in greater detail. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It is noted that the term "comprising", as used in the claims, should not be interpreted as being restricted to the means listed thereafter; this term does not exclude other elements or steps. The term "comprising" is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B, but rather that, with respect to the present invention, the key components of the device are A and B.

Throughout this specification, references to "one embodiment" or "an embodiment" are made. Such references indicate that a particular feature, described in relation to the embodiment, is included in at least one embodiment of the present invention. Thus, appearances of the phrases "in one embodiment" or "in an embodiment" in various places throughout this specification are not necessarily all referring to the same embodiment, though they could.

Furthermore, the particular features or characteristics described herein may be combined in any suitable manner in one or more embodiments, as would be apparent to one of ordinary skill in the art.

Overview

New processes for producing and coloring fiber from recycled polymer (e.g., recycled PET polymer) and virgin polymer (e.g., virgin PET polymer) are described below. In various embodiments, these new processes may include, for example: (1) extruding a polymer (e.g., such as PET) using a primary extruder; (2) adding a colorant to the extruded polymer downstream from the primary extruder; (3) using one or more static mixing elements (e.g., up to thirty six static mixing elements or more) to substantially uniformly mix the extruded polymer and the added colorant; and (4) using a spinning machine to spin the uniformly-mixed extruded polymer and added colorant into bulked continuous filament (e.g., carpet yarn) that has a color that is based on the added colorant. The process described herein may, for example, reduce an amount of waste related to changing a color of bulked continuous filament produced using a particular extruder when switching to a different colorant.

In various embodiments, the primary extruder comprises a multi-rotating screw extruder (MRS extruder). In particular embodiments, the process further comprises: (1) splitting the molten polymer stream extruded from the primary extruder into a plurality of polymer streams (e.g., up to six polymer streams), each of the plurality of polymer streams having an associated spinning machine; (2) adding a colorant to each split polymer stream; (3) using one or more static mixing assemblies for each split polymer stream to substantially uniformly mix each split polymer stream and its respective colorant; and (4) spinning each polymer stream with its substantially uniformly mixed colorant into bulked continuous filament using the respective spinning machine. In such embodiments, a process for producing and coloring bulked continuous filament may utilize a single primary extruder to produce a plurality of different colored filaments (e.g., carpet yarn).

In various embodiments, this new process may, for example: (1) produce less waste than other processes when producing or changing a color of bulked continuous filament produced using a particular extruder; (2) facilitate the production of small batches of particular colors of filament (e.g., for use in rugs or less popular colors of carpet) at a relatively low cost; (3) increase a number of simultaneous filament colors that a single extruder can produce; and (4) etc. In at least one embodiment, the improved process results in reduction of waste of up to about 4,000 pounds of fiber when switching from a first color to a second color (e.g., by adding the colorant downstream from the primary extruder rather than upstream).

In particular embodiments, a smaller number of static mixing elements than described above (e.g., any suitable number between 5 and 20 static mixing elements) may be used to produce a tonal coloring effect within the BCF. This tonal coloring effect may reflect a non-uniform mixing of colorant into the polymer stream.

The tonal effect may be produced due to the fact that the liquid colorant would only be partially further mixed into the polymer stream each time it passes through a single static mixing element. So each time a segment of the colorant/polymer stream mixture passes through another static mixing element, the mixture will become slightly more uniform. After passing through a certain number of static mixing elements (e.g., 30), the colorant/polymer mixture will be substantially uniform. As noted above, the colorant/polymer stream mixture is passed through a number of static mixing elements that is selected to produce a substantially uniform, partial mixture of colorant and polymer. The result is a fiber with a consistent, tonal coloring effect. In various embodiments, the system is adapted to be easily reconfigured (e.g., through the use of quick-release connectors spaced at different points along the length of a series of static mixing elements) to inject colorant so that it passes through the desired number of static mixing elements before exiting the series of static mixing elements. This may allow a user to easily reconfigure the machine to produce BCF with different types of tonal coloring.

More Detailed Discussion

FIG. 1 depicts a high-level overview of BCF manufacturing process 100 for producing and coloring BCF (bulked continuous filament), for example, for use in the production of carpet and other products. The method of manufacturing bulked continuous filament—as indicated in FIG. 1 by 100, may, according to a particular embodiment, in general be broken down into four steps indicated as 102, 104, 106 and 108: (1) passing PET (e.g., or other polymer flakes) through an extruder that melts the flakes and purifies the resulting PET polymer (Step 102); (2) optionally splitting the extruded polymer melt into a plurality of melt streams and adding a colorant to each of the plurality of melt streams (Step 104); (3) using one or more static mixing assemblies to substantially uniformly mix each of the plurality of melt streams with its respective added colorant (Step 106); and (4) feeding each of the substantially uniformly mixed and colored plurality of melt streams into a respective spinning machine that turns the polymer into filament for use in manufacturing carpets (Step 108), thereby ending the method of manufacturing bulked continuous filaments—as indicated in FIG. 1 by 110. These four steps are described in greater detail below.

STEP 1: Using an Extrusion System to Melt and Purify PET

In various embodiments, the step of using an extrusion system to melt and purify PET (e.g., PET flakes and/or pellets) comprises: (A) preparing the PET for extrusion; and (B) using a suitable extruder to melt and purify the PET.

Preparing the PET for Extrusion

In particular embodiments, the step of preparing the PET for extrusion may vary based on a source of the PET. For example, in various embodiments, the process may utilize: (1) virgin PET (e.g., virgin PET pellets); (2) recycled PET (e.g., recycled PET flakes ground from recycled PET bottles and other suitable sources); and/or (3) a combination of virgin and recycled PET. In various embodiments in which the process utilizes recycled PET, the step of preparing the PET for extrusion may include sorting, grinding, washing and other steps designed to remove any impurities from the recycled PET prior to extrusion. These other PET preparation steps may, for example, be unnecessary in embodiments of the process that utilize virgin PET. Because using recycled PET in the process described herein may contribute to even further costs savings to those associated with a reduction in waste due to colorant changing, the process will be described below particularly with respect to recycled PET.

In a particular embodiment, preparing the PET for extrusion may include preparing flakes of PET polymer from post-consumer bottles or other sources of recycled PET. An exemplary process for preparing post-consumer bottles for use in the production of bulked continuous filament is described in U.S. Pat. No. 8,597,553 B1, entitled "Systems and Methods for Manufacturing Bulked Continuous Filament" and published on Dec. 3, 2013, which is hereby incorporated herein in its entirety. Generally speaking, the step of preparing flakes of PET polymer from post-consumer bottles may comprise, for example: (A) sorting post-consumer PET bottles and grinding the bottles into flakes; (B) washing the flakes; and (C) identifying and removing any impurities or impure flakes.

Sorting Post-Consumer PET Bottles and Grinding the Bottles into Flakes

In particular embodiments, bales of clear and mixed colored recycled post-consumer (e.g., "curbside") PET bottles (or other containers) obtained from various recycling facilities make-up the post-consumer PET containers for use in the process. In other embodiments, the source of the post-consumer PET containers may be returned 'deposit' bottles (e.g., PET bottles whose price includes a deposit that is returned to a customer when the customer returns the bottle after consuming the bottle's contents). The curbside or returned "post-consumer" or "recycled" containers may contain a small level of non-PET contaminates. The contaminants in the containers may include, for example, non-PET polymeric contaminants (e.g., PVC, PLA, PP, PE, PS, PA, etc.), metal (e.g., ferrous and non-ferrous metal), paper, cardboard, sand, glass or other unwanted materials that may find their way into the collection of recycled PET. The non-PET contaminants may be removed from the desired PET components, for example, through one or more of the various processes described below.

In particular embodiments, smaller components and debris (e.g., components and debris greater than 2 inches in size) are removed from the whole bottles via a rotating trammel. Various metal removal magnets and eddy current systems may be incorporated into the process to remove any metal contaminants. Near Infra-Red optical sorting equipment such as the NRT Multi Sort IR machine from Bulk Handling Systems Company of Eugene, Oreg., or the Spyder IR machine from National Recovery Technologies of Nashville, Tenn., may be utilized to remove any loose polymeric contaminants that may be mixed in with the PET flakes (e.g., PVC, PLA, PP, PE, PS, and PA). Additionally, automated X-ray sorting equipment such as a VINYL-CYCLE machine from National Recovery Technologies of Nashville, Tenn. may be utilized to remove remaining PVC contaminants.

In particular embodiments, the sorted material is taken through a granulation step (e.g., using a 50B Granulator machine from Cumberland Engineering Corporation of New Berlin, Wis.) to size reduce (e.g., grind) the bottles down to a size of less than one half of an inch. In various embodiments, the bottle labels are removed from the resultant "dirty flake" (e.g., the PET flakes formed during the granulation step) via an air separation system prior to entering the wash process.

Washing the Flakes

In particular embodiments, the "dirty flake" is then mixed into a series of wash tanks. As part of the wash process, in various embodiments, an aqueous density separation is utilized to separate the olefin bottle caps (which may, for example, be present in the "dirty flake" as remnants from recycled PET bottles) from the higher specific gravity PET flakes. In particular embodiments, the flakes are washed in a heated caustic bath to about 190 degrees Fahrenheit. In particular embodiments, the caustic bath is maintained at a concentration of between about 0.6% and about 1.2% sodium hydroxide. In various embodiments, soap surfactants as well as defoaming agents are added to the caustic bath, for example, to further increase the separation and cleaning of the flakes. A double rinse system then washes the caustic from the flakes.

In various embodiments, the flake is centrifugally dewatered and then dried with hot air to at least substantially remove any surface moisture. The resultant "clean flake" is then processed through an electrostatic separation system (e.g., an electrostatic separator from Carpco, Inc. of Jacksonville, Fla.) and a flake metal detection system (e.g., an MSS Metal Sorting System) to further remove any metal contaminants that remain in the flake. In particular embodiments, an air separation step removes any remaining label from the clean flake. In various embodiments, an electro-optical flake sorter based at least in part on Raman technology (e.g., a Powersort 200 from Unisensor Sensorsysteme GmbH of Karlsruhe, Germany) performs the final polymer separation to remove any non-PET polymers remaining in the flake. This step may also further remove any remaining metal contaminants and color contaminants.

In various embodiments, the combination of these steps delivers substantially clean (e.g., clean) PET bottle flake comprising less than about 50 parts per million PVC (e.g., 25 ppm PVC) and less than about 15 parts per million metals for use in the downstream extrusion process described below.

Identifying and Removing Impurities and Impure Flakes

In particular embodiments, after the flakes are washed, they are fed down a conveyor and scanned with a high-speed laser system 300. In various embodiments, particular lasers that make up the high-speed laser system 300 are configured to detect the presence of particular contaminates (e.g., PVC or Aluminum). Flakes that are identified as not consisting essentially of PET may be blown from the main stream of flakes with air jets. In various embodiments, the resulting level of non-PET flakes is less than 25 ppm.

In various embodiments, the system is adapted to ensure that the PET polymer being processed into filament is substantially free of water (e.g., entirely free of water). In a particular embodiment, the flakes are placed into a pre-conditioner for between about 20 and about 40 minutes (e.g., about 30 minutes) during which the pre-conditioner blows the surface water off of the flakes. In particular embodiments, interstitial water remains within the flakes. In various embodiments, these "wet" flakes (e.g., flakes comprising interstitial water) may then be fed into an extruder (e.g., as described below), which includes a vacuum setup designed to remove—among other things—the interstitial water that remains present in the flakes following the quick-drying process described above.

Using an Extrusion System to Melt and Purify PET Flakes

Figure 2:
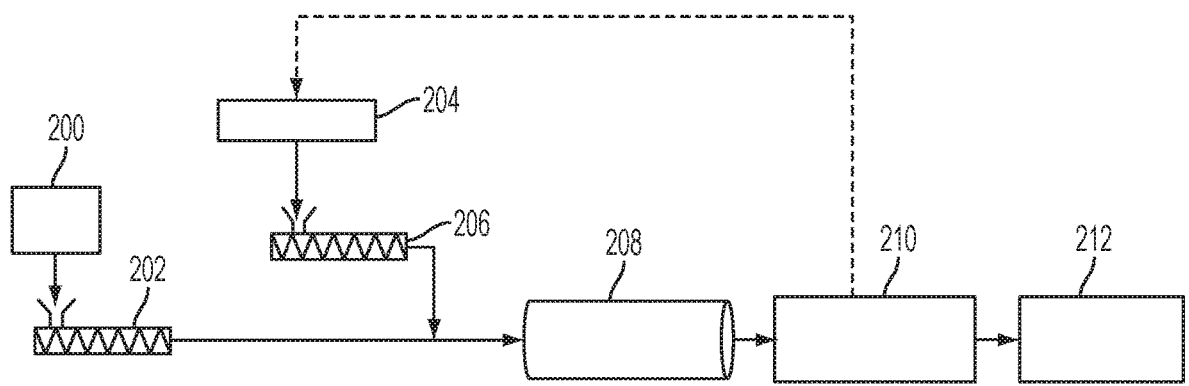
FIG. 2 depicts a process flow, according to a particular embodiment, for adding a colorant to a stream of molten polymer downstream from a first extruder.
Figure 3:
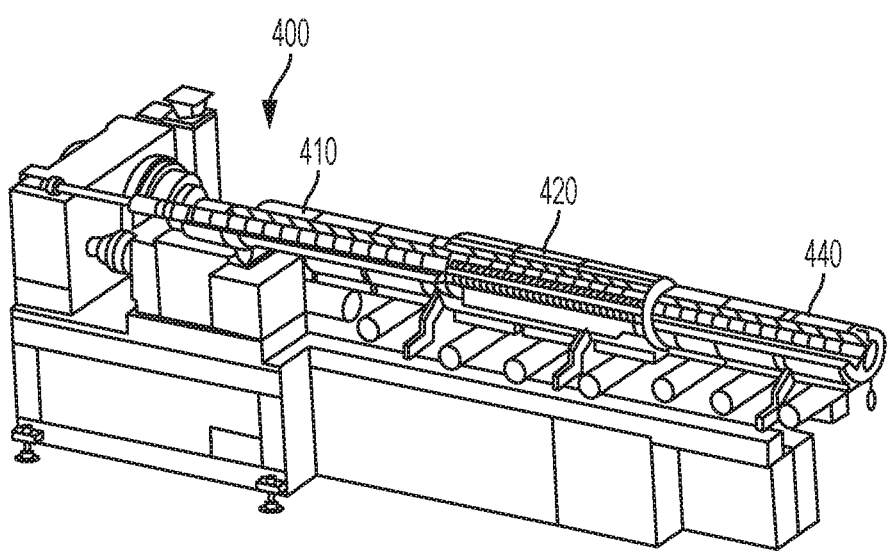
FIG. 3 is a perspective view of an MRS extruder that is suitable for use as the first extruder of FIG. 2.
Figure 4:
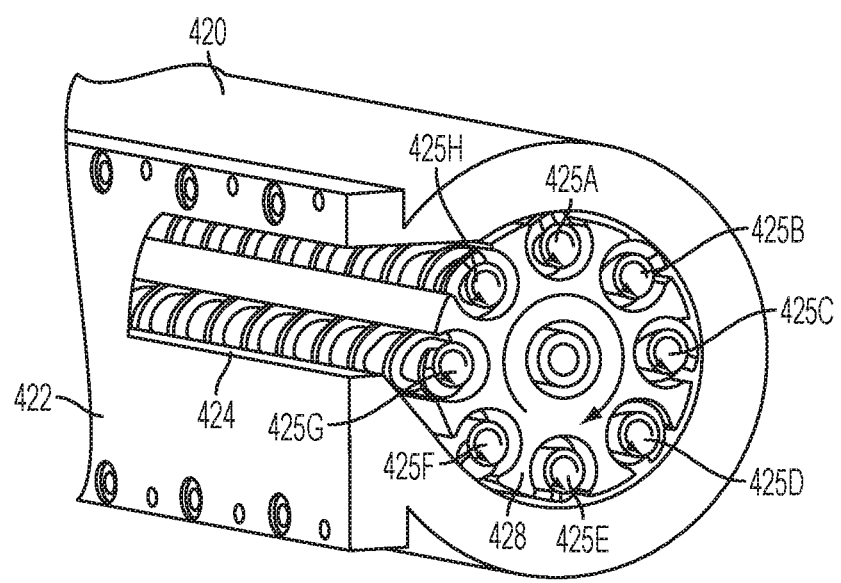
FIG. 4 is a cross-sectional view of an exemplary MRS section of the MRS extruder of FIG. 2.

FIG. 2 depicts an exemplary process flow for producing BCF with an added colorant according to particular embodiments. As shown in FIG. 2, in various embodiments, a suitable primary extruder 202 is used to melt and purify PET 200, such as any suitable PET 200 prepared in any manner described above. In a particular embodiment, the primary extruder 202 comprises any suitable extruder such as, for example, a Multiple Rotating Screw ("MRS") extruder, a twin screw extruder, a multiple screw extruder, a planetary extruder, or any other suitable extrusion system. An exemplary MRS Extruder 400 is shown in FIGS. 3 and 4. A particular example of such an MRS extruder is described in U.S. Published Patent Application 2005/0047267, entitled "Extruder for Producing Molten Plastic Materials", which was published on Mar. 3, 2005, and which is hereby incorporated herein by reference.

As may be understood from FIGS. 3 and 4, in particular embodiments, the MRS extruder includes a first single-screw extruder section 410 for feeding material into an MRS section 420 and a second single-screw extruder section 440 for transporting material away from the MRS section.

As may be understood from FIG. 3, in various embodiments, PET is first fed through the MRS extruder's first single-screw extruder section 410, which may, for example, generate sufficient heat (e.g., via shearing) to at least substantially melt (e.g., melt) the wet flakes.

The resultant polymer melt (e.g., comprising the melted PET), in various embodiments, is then fed into the extruder's MRS section 420, in which the extruder separates the melt flow into a plurality of different streams (e.g., 4, 5, 6, 7, 8, or more streams) through a plurality of open chambers. FIG. 4 shows a detailed cutaway view of an MRS Section 420 according to a particular embodiment. In particular embodiments, such as the embodiment shown in this figure, the MRS Section 420 separates the melt flow into eight different streams, which are subsequently fed through eight satellite screws 425A-H. As may be understood from FIG. 3, in particular embodiments, these satellite screws are substantially parallel (e.g., parallel) to one other and to a primary screw axis of the MRS Machine 400.

As shown in FIG. 4, in particular embodiments: (1) the satellite screws 425A-H are arranged within a single screw drum 428 that is mounted to rotate about its central axis; and (2) the satellite screws 425A-H are configured to rotate in a direction that is opposite to the direction in which the single screw drum rotates 428. In various other embodiments, the satellite screws 425A-H and the single screw drum 428 rotate in the same direction. In particular embodiments, the rotation of the satellite screws 425A-H is driven by a ring gear. Also, in various embodiments, the single screw drum 428 rotates about four times faster than each individual satellite screw 425A-H. In certain embodiments, the satellite screws 425A-H rotate at substantially similar (e.g., the same) speeds.

In various embodiments, as may be understood from FIG. 4, the satellite screws 425A-H are housed within respective extruder barrels, which may, for example be about 30% open to the outer chamber of the MRS section 420. In particular embodiments, the rotation of the satellite screws 425A-H and single screw drum 428 increases the surface exchange of the polymer melt (e.g., exposes more surface area of the melted polymer to the open chamber than in previous systems). In various embodiments, the MRS section 420 creates a melt surface area that is, for example, between about twenty and about thirty times greater than the melt surface area created by a co-rotating twin screw extruder. In a particular embodiment, the MRS section 420 creates a melt surface area that is, for example, about twenty-five times greater than the melt surface area created by a co-rotating twin screw extruder.

In various embodiments, the MRS extruder's MRS Section 420 is fitted with a vacuum pump that is attached to a vacuum attachment portion 422 of the MRS section 420 so that the vacuum pump is in communication with the interior of the MRS section via a suitable opening 424 in the MRS section's housing. In still other embodiments, the MRS Section 420 is fitted with a series of vacuum pumps. In particular embodiments, the vacuum pump is configured to reduce the pressure within the interior of the MRS Section 420 to a pressure that is between about 0.5 millibars and about 25 millibars. In particular embodiments, the vacuum pump is configured to reduce the pressure in the MRS Section 420 to less than about 5 millibars (e.g., about 1.8 millibars or less). The low-pressure vacuum created by the vacuum pump in the MRS Section 420 may remove, for example: (1) volatile organics present in the melted polymer as the melted polymer passes through the MRS Section 420; and/or (2) at least a portion of any interstitial water that was present in the wet flakes when the wet flakes entered the MRS Extruder 400. In various embodiments, the low-pressure vacuum removes substantially all (e.g., all) of the water and contaminants from the polymer stream.

In some embodiments, after the molten polymer is run the through the multi-stream MRS Section 420, the streams of molten polymer are recombined and flow into the MRS extruder's second single screw section 440. In particular embodiments, passage through the low pressure MRS Section 420 purifies the recycled polymer melt (e.g., by removing the contaminants and interstitial water) and makes the recycled polymer substantially structurally similar to (e.g., structurally the same as) pure virgin PET polymer. In particular embodiments, the resulting polymer is a recycled PET polymer (e.g., obtained 100% from post-consumer PET products, such as PET bottles or containers) having a polymer quality that is suitable for use in producing PET carpet filament using substantially only (e.g., only) PET from recycled PET products.

STEP 2: Add a Colorant to the Polymer Melt Downstream from the Primary Extruder

In particular embodiments, after the recycled PET polymer (e.g., or virgin PET) has been extruded and purified by the above-described extrusion process, a colorant is added to the resultant polymer melt. As shown in FIG. 2, Colorant A 204 may be added to the polymer melt using a suitable secondary extruder 206. In various embodiments, the secondary extruder 206 may include any suitable extruder such as for example, any suitable single-screw extruder or other extruder described herein (e.g., a twin screw extruder, a multiple screw extruder, a planetary extruder, or any other suitable extrusion system). In particular embodiments, a suitable secondary extruder 206 may include, for example, an HPE-150 Horizontal Extruder manufactured by David-Standard, LLC of Pawcatuck, Conn.

In particular embodiments, Colorant A 204 may comprise pelletized color concentrate which the secondary extruder 206 is configured to at least partially melt prior to adding Colorant A 204 to the polymer melt. In various other embodiments, Colorant A 204 may comprise other additives such as, for example, a carrier resin which may aid in binding the colorant to the polymer. In other embodiments, Colorant A 204 may include any suitable liquid colorant which may be pumped into the polymer melt using any suitable pump (e.g., in lieu of using a secondary extruder 206 and pelletized color concentrate).

In various embodiments, the process may further include monitoring an amount of throughput (e.g., polymer output) from the primary extruder 202 in order to determine an appropriate amount of letdown (e.g., an appropriate let down ratio) such that a proper amount of Colorant A 204 is added to the polymer melt downstream from the primary extruder 202. In various embodiments, a desirable letdown ratio may include a letdown ratio of between about two percent and about eight percent. In other embodiments, the letdown ratio may include any other suitable letdown ratio (e.g., one percent, two percent, three percent, four percent, five percent, six percent, seven percent, etc.). In particular embodiments, the letdown ratio may vary based on a desired color of bulked continuous filament ultimately produced using the process (e.g., up to about twenty percent).

In various embodiments, adding the colorant 204 downstream of the primary extruder 202 may save on waste during color changeover. For example, when switching between producing bulked continuous filament of a first color to producing bulked continuous filament of a second color, it is necessary to change the colorant 204 added to the polymer melt (e.g., from a first colorant that would result in bulked continuous filament of the first color to a second colorant that would result in bulked continuous filament of the second color). As may be understood by one skilled in the art, after switching from adding the first colorant to the polymer melt to adding the second colorant to the polymer melt, residual first colorant may remain in in the system between the point in the process at which the colorant is added and the spinning machine 212. For example, residual first colorant may remain in the secondary extruder 206, the one or more static mixing assemblies 208, or any other physical mechanism used in the process (such as any mechanism shown in FIG. 2) or any piping or tubing which connects the various components of the system.

As may be understood by one skilled in the art, after running the process with the second colorant for a suitable amount of time, the bulked continuous filament produced by the process will eventually be of the second, desired color (e.g., because the first colorant will eventually be substantially flushed out the system). Between the point at which there is a changeover in adding the second colorant to the process rather than the first colorant and the point at which the process begins to produce the desired color of bulked continuous filament, the process will produce some waste bulked continuous filament that is of an undesired color (e.g., due at least in part to the residual first colorant).

In various embodiments, the waste bulked continuous filament produced using the process described herein may be considerably lower than waste bulked continuous filament produced during color changeovers using other processes (e.g., such as other processes in which colorant is added to PET prior to extrusion in a primary extruder such as an MRS extruder). For example, in various embodiment, the process described herein may limit waste bulked continuous filament to an amount of bulked continuous filament produced when running a single package of colorant (e.g., of the second colorant), which may, for example, result in less than about 100 pounds of waste. In particular embodiments, reducing waste may lead to cost savings in the production of bulked continuous filament.

Figure 5:
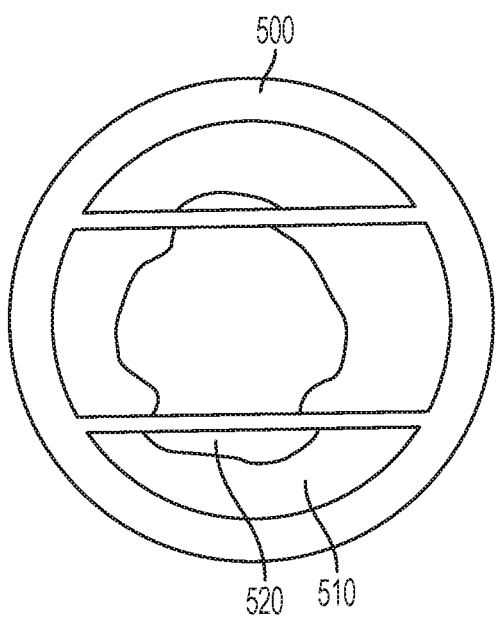
FIG. 5 is a cross-sectional end view of dispersion of a colorant in a stream of molten polymer prior to passing through the one or more static mixing assemblies shown in FIG. 2.
Figure 6:
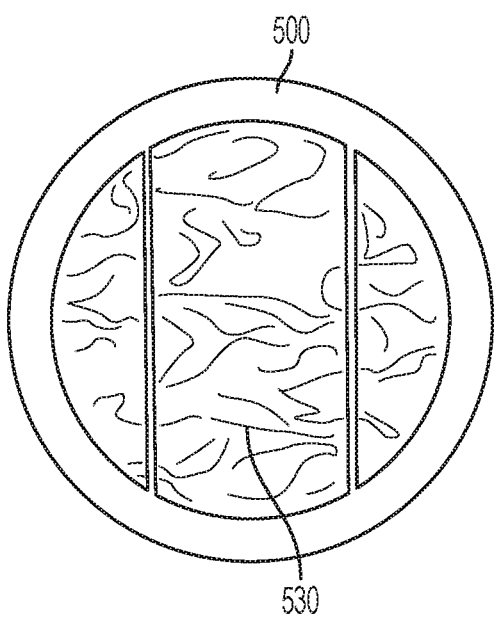
FIG. 6 is a cross-sectional end view of dispersion of a colorant in a stream of molten polymer following passing through the one or more static mixing assemblies shown in FIG. 2.

STEP 3: Use One or More Static Mixing Assemblies to Mix Polymer Melt with Added Colorant In particular embodiments, following the addition of Colorant A 204 to the stream of molten polymer, the process includes the use of one or more static mixing assemblies 208 (e.g., one or more static mixing elements) to mix and disperse Colorant A 204 throughout the polymer stream. As may be understood by one skilled in the art, due in part to the viscosity of the polymer stream (e.g., polymer melt), when a dye or other colorant is added to the polymer stream, the dye and the stream may not mix. In various embodiments, the flow of the polymer melt is substantially laminar (e.g., laminar) which may, for example, further lead to a lack of mixing. FIG. 5 depicts a cross section view of a pipe 500 containing a polymer melt 510 into which a liquid colorant 520 has been added. As shown in this Figure, the liquid colorant 520 has not mixed with the polymer melt 510. Generally speaking, the unmixed polymer melt 510 and colorant 520 may not be suitable for forming into bulked continuous filament (e.g., because the resulting filament may not have a consistent, uniform color). FIG. 6 depicts the pipe 500 of FIG. 5 in which the liquid colorant 520 and the polymer melt 510 have been substantially thoroughly (e.g., uniformly) mixed into a colored melt stream 530. This substantially uniform mixing, in various embodiments, is achieved through the use of the one or more static mixing assemblies 208 as shown in FIG. 2. Generally speaking, this uniformly mixed colored melt stream 530 shown in FIG. 5 may be far more suitable for producing uniformly colored bulked continuous filament.

Figure 7:
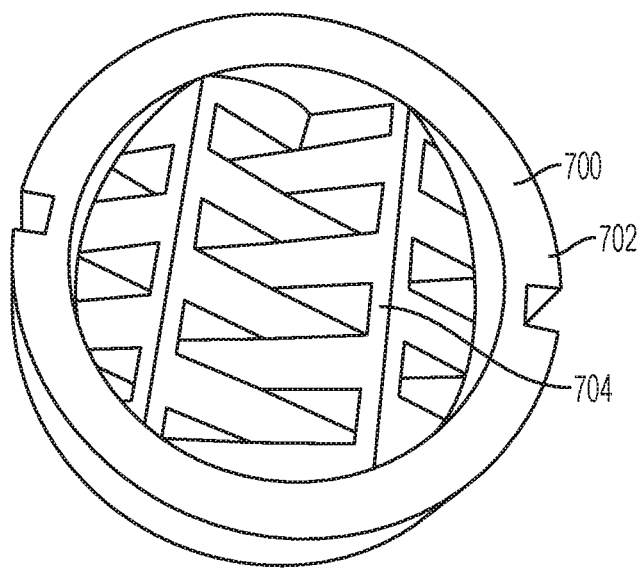
FIG. 7 is a cross-sectional end view of the exemplary one of the one or more static mixing elements of FIG. 2, according to a particular embodiment.

FIG. 7 depicts an exemplary static mixing element 700 which may, in various embodiments, be utilized in the achievement of substantially uniform (e.g., uniform) mixing of the polymer melt and the added colorant (e.g., Colorant A 204 from FIG. 2). As may be understood from this Figure, a static mixing element 700 may comprise a housing 702 (e.g., a substantially circular or cylindrical housing) and be inserted into a pipe or other housing (e.g., incorporated into a pipe or other housing). In the embodiment shown in this Figure, the static mixing element 700 comprises a plurality of mixing bars 704 disposed within the housing 702. In particular embodiments, the static mixing element 700 creates mixing by directing two or more viscous materials to follow the geometric structure of the mixing bars 704 disposed within the housing 702 that continuously divide and recombine the flow. In various embodiments, a very high degree of mixing may be achieved over a short length of static mixing elements. In particular embodiments, the static mixing element 700 comprises no moving parts and is made of any suitable material such as, for example high strength heat treated stainless steel, a suitable plastic, or any other suitable material.

Figure 8:
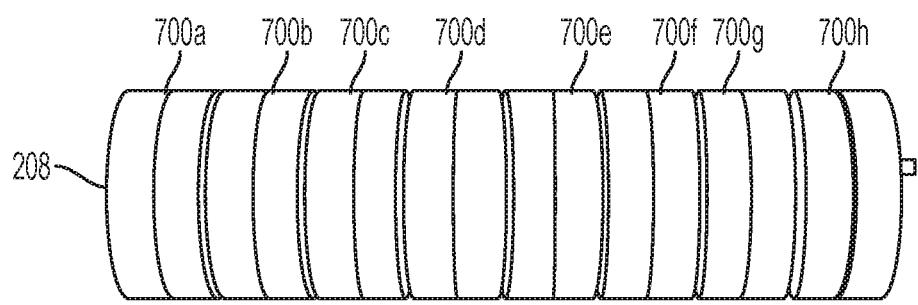
FIG. 8 is a side view of eight of the exemplary static mixing elements of FIG. 7 coupled to one another to form a static mixing assembly.

In particular embodiments, the static mixing assemblies 208 shown in FIG. 2 comprise any suitable static mixing element, such as, for example, a Stamixco GXR 40/50 or GXR 52/60 made by Stamixco LLC of Brooklyn, N.Y. A suitable mixing element for use as or within a static mixing assembly is described in U.S. Pat. No. 8,360,630 B2, entitled "Mixing Elements for a Static Mixer and Process for Producing Such a Mixing Element" and published on Jan. 29, 2013, which is hereby incorporated herein in its entirety. In other embodiments, the one or more static mixing assemblies 208 may comprise any other suitable static mixing element having a suitable arrangement of mixing bars for dispersing the colorant throughout the polymer melt. In particular embodiments, the one or more static mixing assemblies 208 comprise a plurality of individual static mixing elements 700 such as is shown in FIG. 8. FIG. 8 depicts eight static mixing elements 700*a-h* coupled to one another to form a static mixing assembly 208. In other embodiments, the static mixing assemblies 208 may comprise any suitable number of individual static mixing elements 700 (e.g., up to 36 or 40 individual static mixing elements). In particular embodiments, the individual static mixing elements 700 may be oriented in any suitable direction relative to one another (e.g., oriented randomly relative to one another when coupled to one another as shown in FIG. 8).

Figure 9:
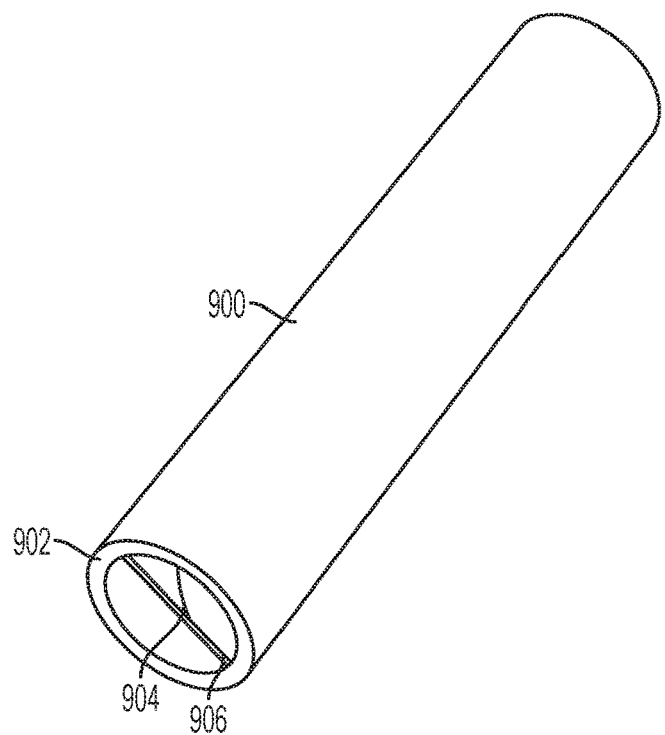
FIG. 9 is a perspective view of an exemplary helical static mixing assembly according to a particular embodiment.

In various other embodiments, the static mixing assemblies 208 may comprise a suitable number of static mixing elements comprising one or more suitable helical mixing elements. FIG. 9 depicts an exemplary helical static mixing assembly 900 comprising a substantially cylindrical (e.g., cylindrical) housing 902 in which at least one helical mixing element 904 is disposed). As shown in this Figure, the at least one helical mixing element 904 defines a leading edge 906 that extends between opposing interior portions of the cylindrical housing (e.g., along a diameter of the cylindrical housing). In various embodiments, the leading edge 906 is substantially planar (e.g., linear) and has any suitable thickness. As may be understood from this Figure, the leading edge 906 may divide (e.g., bisect) a polymer melt flowing into the helical static mixing assembly 900 into two streams (e.g., a first stream on a first side of the leading edge 906 and a second stream on a second side). In particular embodiments, the leading edge may divide the flow into substantially equal streams as material passes the helical mixing element 904.

Figure 10:
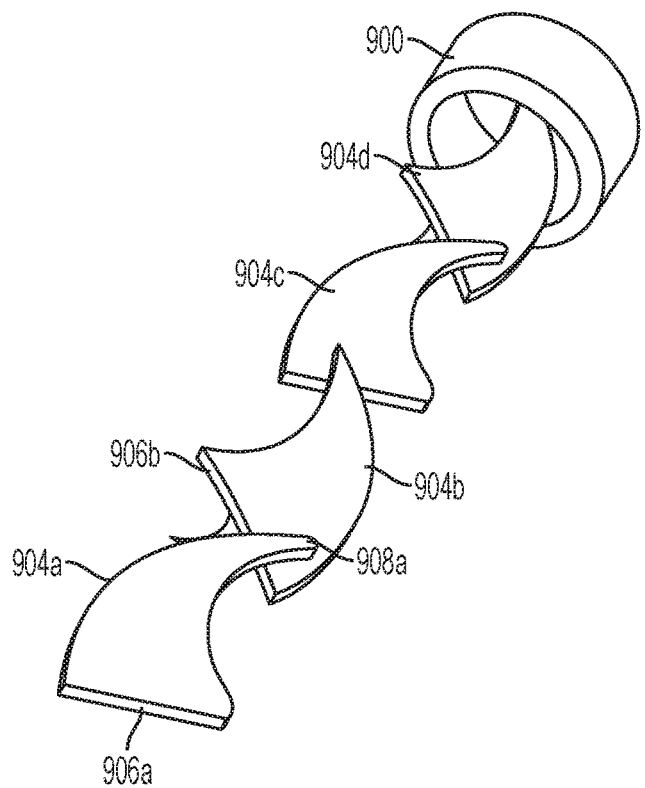
FIG. 10 is a perspective cutaway view of the helical static mixing assembly of FIG. 9 showing four helical static mixing elements.

FIG. 10 depicts the helical static mixing assembly 900 of FIG. 9 in a cutaway view that shows four helical mixing elements 904 disposed within the housing 902. As may be further understood from FIG. 10, each individual helical mixing element 904 (e.g., helical mixing element 904a) comprises a substantially rectangular (e.g., rectangular) plate defining a leading edge 906a and a trailing edge 908a that has been twisted about 180 degrees (e.g., 180 degrees). As shown in this Figure, the leading edge 906a and trailing edge 908a are substantially parallel (e.g., parallel) to one another and the helical mixing element 904a extends between the leading edge 906a and trailing edge 908a in a helical pattern. Although in the embodiment shown in this Figure, the helical mixing element 904a is shown having a twist of 180 degrees between the leading edge 906a and trailing edge 908a, it should be understood that in various other embodiments, each individual helical mixing element 904 may comprise any other suitable helical shape or portion thereof. For example, in particular embodiments, the helical mixing element 904 may comprise a substantially rectangular plate defining a leading edge 906 and a trailing edge 908 that has been twisted any other suitable amount between zero and 360 degrees (e.g., 45 degrees, 90 degrees, 270 degrees, etc.) In still other embodiments, the helical mixing element 904 may have any suitable length relative to its diameter.

As may be further understood from FIG. 10, in various embodiments, each particular helical mixing element 904a-d is disposed within the housing 902 at an angle to an adjacent helical mixing element 904. For example, helical mixing element 904a is disposed such that a trailing edge 908a of helical mixing element 904a forms an angle with the leading edge 906b of helical mixing element 906b. In particular embodiments, the trailing edge 908a and leading edge 906b of adjacent helical mixing elements 904 may form any suitable angle with one another. In particular embodiments, the trailing edge 908a and leading edge 906b of adjacent helical mixing elements 904 may form an angle of between about zero degrees and about ninety degrees with one another. In particular embodiments, the trailing edge 908a and leading edge 906b of adjacent helical mixing elements 904 may at least partially abut one another and be substantially co-facing (e.g., co-facing). In particular embodiments, the trailing edge 908a and leading edge 906b of adjacent helical mixing elements 904 may form a particular angle between one another (e.g., zero degrees, ninety degrees, forty-five degrees, or any other suitable angle). A suitable helical static mixing assembly for use in the above-described process may include, for example, the any suitable helical static mixing assembly manufactured by JLS International of Charlotte, N.C.

It should be understood that for the purposes of this disclosure, a static mixing assembly 208 may be configured in any desired arrangement to provide a desired number of one or more individual mixing elements to a polymer stream. For example, a static mixing assembly 208 may include a single mixing element within a single housing with one or more mixing bars 704 and/or one or more helical mixing elements 904 disposed within the housing. Alternatively, the static mixing assembly 208 may include multiple static mixing elements positioned in series within a single housing. According to yet another alternative embodiment, the static mixing assembly 208 may include a plurality of static mixing elements, each having their own respective housing positioned in series adjacent to one another. In this embodiment, the plurality of static mixing elements are collectively considered the static mixing assembly 208. For example, in particular embodiments, the static mixing assembly 208 comprises up to thirty-six individual static mixing elements (e.g., thirty-six static mixing elements, thirty-four static mixing elements, etc.). In still other embodiments, the static mixing assembly 208 comprises any other suitable number of static mixing elements sufficient to substantially uniformly (e.g., homogeneously) mix the molten polymer with the added colorant (e.g., to substantially uniformly mix the molten polymer and the added colorant into a colored melt stream 530 as shown in FIG. 6). This may include, for example, up to 40 static mixing elements, or any other suitable number).

In particular embodiments, the one or more static mixing assemblies 208 may comprise any suitable combination of static mixing elements such as, for example, any suitable break down of the static mixing element 700 shown in FIG. 7 and the helical static mixing assembly 900 and/or helical mixing elements 904 shown in FIGS. 9 and 10. For example, in a particular embodiment, the static mixing assemblies 208 may comprise thirty-six helical mixing elements 904. In other embodiments, the static mixing assemblies 208 may comprise thirty-six static mixing elements 700 from FIG. 7. In various embodiments, the static mixing assemblies 208 may comprise any suitable number of alternating static mixing elements 700 shown in FIG. 7 and helical mixing elements 904 shown in FIGS. 9 and 10. In various other embodiments, the static mixing assemblies 208 may comprise up to a total of forty (e.g., thirty-six), or more, individual static mixing elements 700 shown in FIG. 7 and helical mixing elements 904 shown in FIGS. 9 and 10. In such embodiments, the static mixing elements 700 from FIG. 7 and the helical mixing elements 904 may be arranged in any suitable order (e.g., a specific order, a random order, a pattern such as a repeating pattern, etc.).

Creating a Tonal Color in Polymer Melt

According to various embodiments, it may be desirable to create BCF for use in the production of carpet and other products that is not uniform in color. Specifically, it may be desirable to create BCF that has a tonal color effect. For the purposes of this disclosure, BCF having a tonal color effect may include BCF having any color that is not uniform, such as BCF that includes different shades of the same color (e.g., with gradual changes between one shade to another). Conventionally, tonal color effects may be created using one or more yarns or filaments having one dark end and one light end, which are twisted together to create a tonal yarn. However, using the concepts and technologies described herein, a tonal color effect may be created using a single yarn, without utilizing the conventional twisting process.

According to one embodiment, the tonal effect characteristic of the polymer stream and resulting BCF product may be created using a smaller number of static mixing elements (individual static mixing elements 700 or helical mixing elements 904) as compared to the at least thirty individual static mixing elements utilized to create the uniformly mixed and uniformly colored polymer streams described above.

For example, according to one implementation, a smaller number of individual static mixing elements 700 or helical static mixing elements 904 (e.g., any discrete number less than thirty) may be used to create the static mixing assemblies 208 of FIG. 2. By using a relatively small number of individual static mixing elements, in various embodiments, the colorant injected into the laminar flow of the polymer stream traversing through the static mixing assemblies 208 is not uniformly mixed into the polymer stream prior to being received by the spinning machine 212.

While, in various embodiments, providing a static mixing assembly 208 with fewer individual static mixing elements (i.e., static mixing elements 700 or helical static mixing elements 904) may create a tonal color characteristic in the resulting polymer stream, various embodiments described herein may produce tonal color effects, while allowing for the same BCF manufacturing system to be utilized to create both uniformly-colored BCF and BCF having tonal color effects with, in various embodiments, minimal time and effort in changing the system set up between manufacturing runs of the two products.

Figure 13:
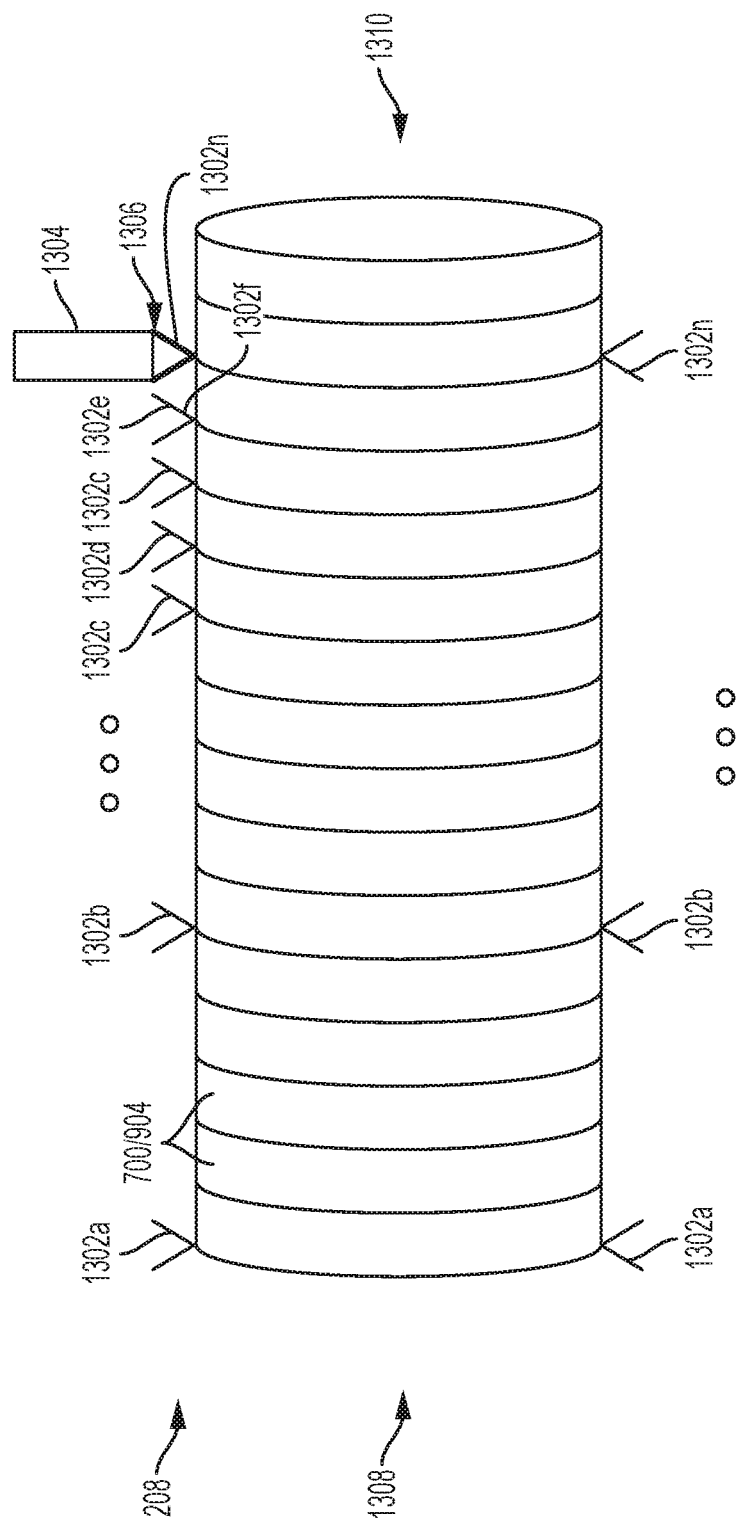
FIG. 13 depicts a side view of a static mixing assembly having individual static mixing elements coupled to one another to form a static mixing assembly and one or more colorant ports coupled to the static mixing assembly.

Turning to FIG. 13, a static mixing assembly 208 is shown having a number of individual static mixing elements 700, 904 coupled together to create a length of the static mixing assembly 208 through which the polymer stream flows and mixes. It should be appreciated that for clarity purposes, the static mixing assembly 208 is shown with a reduced quantity of individual static mixing elements 700, 904 shown in FIG. 13. As disclosed herein, the static mixing assembly 208 of various embodiments may have more than thirty (i.e., thirty six or forty) individual static mixing elements 700, 904.

According to various embodiments, the static mixing assembly 208 has one or more colorant ports 1302*a-n* (collectively referred to as colorant ports 1302), and/or liquid injection nozzles, positioned along a length of the static mixing assembly 208. The one or more colorant ports 1302 may include any type of port suitable for facilitating the injection of colorant from one or more colorant container 1304 into the polymer stream within the static mixing assembly 208. According to one embodiment, the one or more colorant ports 1302 include threads for receiving the one or more colorant containers 1304 and/or one or more mechanisms coupled to the one or more colorant containers 1304. In other embodiments, the one or more colorant ports 1302 and the one or more colorant containers 1304 are coupled together via a quick-disconnect connection 1306 that allows for easy and rapid connection of the one or more colorant containers 1304 to/from the colorant ports 1302.

Once a colorant container 1304 is connected to a respective colorant port 1302, colorant may be injected from the container, through the port and into: (1) a location that is adjacent the center of the polymer stream within the static mixing assembly 208; (2) a location proximate to an inside wall of the housing 702 of the static mixing assembly 208; and/or (3) any other suitable location. Injecting the colorant into the center of the polymer stream may result in more uniform or predictable mixing, while injecting the colorant into the polymer stream proximate to a wall of the static mixing assembly's housing 702 may yield more distinct tonal color effects in the resulting colored polymer stream and corresponding BCF product.

FIG. 13 shows three pairs of colorant ports 1302*a-n* positioned in three different locations along the length of the static mixing assembly 208, and four individual colorant ports 1302*c*-1302*f*. It should be appreciated that any number of colorant ports 1302*a-n* may be used at each respective distance along the length of the static mixing assembly 208, and that groups of one or more colorant ports 1302*a-n* may be positioned at any respective distance along the length of the static mixing assembly 208 without departing from the scope of this disclosure. In particular embodiments, one or more colorant ports are positioned between each of at least 2, 3, 4, 5, 6, 7, or 8 consecutive respective adjacent pairs of mixing elements within the mixing assembly.

For example, while the one or more colorant ports 1302 are shown in pairs at each location, various embodiments may utilize only a single colorant port 1302 at each location, or may alternatively utilize more than two colorant ports 1302 at each location along the length of the static mixing assembly 208. According to an alternative embodiment, the positioning of the one or more colorant ports 1302 around the circumference of the static mixing assembly 208 may differ. For example, a first colorant port 1302*a* may be positioned on a top side (i.e., at the zero degree location when viewing the circular cross-section) of the static mixing assembly 208, while a second colorant port 1302*b* that is located downstream along the length of the static mixing assembly 208 may be positioned on the right side (i.e., at the 90 degree location when viewing the circular cross-section) of the static mixing assembly 208. The various radial positioning around the circumference of the static mixing assembly 208 may yield different tonal color effects in the colored polymer stream exiting the static mixing assembly 208 if the colorant is injected within the polymer stream at a location other than centrally (i.e., proximate to the wall of the housing 702).

The static mixing assembly 208 shown in FIG. 13 has one or more colorant ports 1302*a* positioned at the upstream end 1308 of the static mixing assembly 208 where the polymer stream enters. As described above, providing colorant at the upstream end 1308 may result in a uniform mix and corresponding uniformly colored polymer stream exiting the downstream end 1310 of the static mixing assembly 208. However, if colorant is added at locations downstream of the upstream end 1308, less mixing of the colorant with the polymer stream may occur, resulting in a tonal color effect. As discussed, colorant added at the one or more colorant ports 1302*n* positioned within 5 to 20 individual static mixing elements from the downstream end 1310 of the static mixing assembly 208, the resulting colored polymer stream is most likely to possess distinct tonal color effects that may be formed into a tonal yarn using one or more spinning machines 212.

According to one embodiment, multiple colorant containers 1304 (e.g., that are configured to selectively deliver liquid colorant under pressure—e.g., via a suitable pump arrangement, such as any suitable pump arrangement described below) may be utilized simultaneously with multiple corresponding colorant ports 1302 at different locations along the length of the static mixing assembly 208 to create tonal color effects with multiple colors. For example, a first one or more colorant containers 1304 having a first color may be coupled to the one or more colorant ports 1302*b*, while a second one or more colorant containers 1304 having a second color may be coupled to the one or more colorant ports 1302*n*. The resulting colored polymer stream may contain tonal color effects with respect to the first color that are more subtle than the tonal color effects associated with the second color that are present in the same colored polymer stream since the polymer stream and the first color mix for a longer period of time than the colored polymer stream (containing a mix with the first color) and the second color.

Alternatively, according to another embodiment, a first one or more colorant containers 1304 having a first color may be coupled to the one or more colorant ports 1302n shown on the top side of the static mixing assembly 208, while a second one or more colorant containers 1304 having a second color may be coupled to the one or more colorant ports 1302n shown on the bottom side of the static mixing assembly 208. In this embodiment, two different colorants are injected into the polymer stream at different radial locations around the circumference of the static mixing assembly 208. Doing so may allow the polymer stream, the first colorant, and the second colorant to mix for a short length prior to exiting the downstream end 1310 of the static mixing assembly 208 with a unique tonal color effect.

Figure 14:
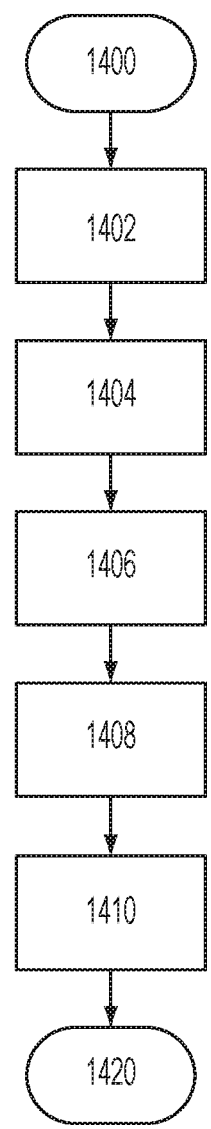
FIG. 14 depicts a high level overview of a manufacturing process for producing and coloring a bulked continuous filament with a tonal color effect.

FIG. 14 depicts a high level overview of BCF manufacturing process 1400 for producing and coloring BCF with a tonal color effect, for example, for use in the production of carpet and other products. The method of manufacturing bulked continuous filaments—as indicated in FIG. 14 by 1400, may be split in five steps:

Pass PET (e.g., or other polymer flakes) through an extruder that melts the flakes and purifies the resulting PET polymer (step 1402);

Optionally split the extruded polymer melt into a plurality of melt streams (step 1404);

Use a static mixing assembly to mix each of the plurality of melt streams (step 1406);

Add colorant to a static mixing assembly at desired locations along the length of the mixer to partially mix colorant with the melt streams (step 1408);

Feed each of the melt streams with tonal color effect into a respective spinning machine that turns the polymer into tonal filament for use in manufacturing carpets or other products (step 1410);

thereby ending the method manufacturing bulked continuous filaments—as indicated in FIG. 14 by 1420.

The process 1400 begins as described above with respect to steps 1 and 2 of FIG. 1 above. Specifically, at operation 1402, PET or other polymer flakes are passed through an extruder that melts the flakes and purifies the resulting PET polymer. At operation 1404, the extruded polymer stream may then be optionally split into a plurality of polymer streams. At operation 1406, one or more static mixing assemblies 208 may be used to mix each of the polymer streams. Colorant is added at operation 1408 to the one or more static mixing assemblies 208 through one or more colorant ports 1302. The one or more colorant ports 1302 that are used for injecting colorant may be selected based on the location of the one or more colorant ports 1302 along the length of the one or more static mixing assemblies 208. The locations of the one or more colorant ports 1302 determine the amount of mixing of the one or more colorants with the polymer stream within the static mixing assembly 208 and the desired tonal color effect of the resulting BCF product. At operation 1410, each of the polymer streams with the desired tonal color effects are fed into a respective spinning machine 212 to turn the polymer into a tonal filament for use in manufacturing carpets or other products, as described in further detail below.

STEP 4: Use of a Spinning Machine to Turn the Colored Polymer into Filament

Referring back to FIG. 2, after the polymer melt and the added colorant have been sufficiently mixed using the one or more static mixing assemblies 208 (e.g., homogeneously mixed), the resultant colored melt stream may be fed directly into BCF (or "spinning") machine 212 that is configured to turn the molten polymer into bulked continuous filament (See FIG. 2). In particular embodiments, the spinning machine 212 extrudes molten polymer through small holes in a spinneret in order to produce carpet yarn filament from the polymer. In particular embodiments, the molten recycled PET polymer cools after leaving the spinneret. The carpet yarn is then taken up by rollers and ultimately turned into filaments that are used to produce carpet. In various embodiments, the carpet yarn produced by the spinning machine 212 may have a tenacity between about 3 gram-force per unit denier (gf/den) and about 9 gf/den. In particular embodiments, the resulting carpet yarn has a tenacity of at least about 3 gf/den.

In particular embodiments, the spinning machine 212 used in the process described above is the Sytec One spinning machine manufactured by Oerlikon Neumag of Neumuenster, Germany. The Sytec One machine may be especially adapted for hard-to-run fibers, such as nylon or solution-dyed fibers, where the filaments are prone to breakage during processing. In various embodiments, the Sytec One machine keeps the runs downstream of the spinneret as straight as possible, uses only one threadline, and is designed to be quick to rethread when there are filament breaks.

Although the example described above describes using the Sytec One spinning machine to produce carpet yarn filament from the polymer, it should be understood that any other suitable spinning machine may be used. Such spinning machines may include, for example, any suitable one-threadline or three-threadline spinning machine made by Oerlikon Neumag of Neumuenster, Germany or any other company.

In various embodiments, prior to using the spinning machine 212 to spin the colored melt into filament, the process may utilize one or more color sensors 210 to determine a color of the colored melt. In various embodiments, the one or more color sensors 210 comprises one or more spectrographs configured to separate light shone through the polymer melt into a frequency spectrum to determine the color of the polymer melt. In still other embodiments, the one or more color sensors 210 comprises one or more cameras or other suitable imaging devices configured to determine a color of the resultant polymer melt. In particular embodiments, in response to determining that the color of the polymer melt is a color other than a desired color (e.g., the polymer melt is lighter than desired, darker than desired, a color other than the desired color, etc.) the system may: (1) discard the portion of the stream with the incorrect color; and/or (2) adjust an amount of colorant 204 that is added to the flake and/or the polymer melt upstream in order to adjust a color of the resultant polymer melt. In particular embodiments, adjusting the amount of colorant 204 is executed in a substantially automated manner (e.g., automatically) using the one or more color sensors 210 in a computer-controlled feedback control loop.

Figure 11:
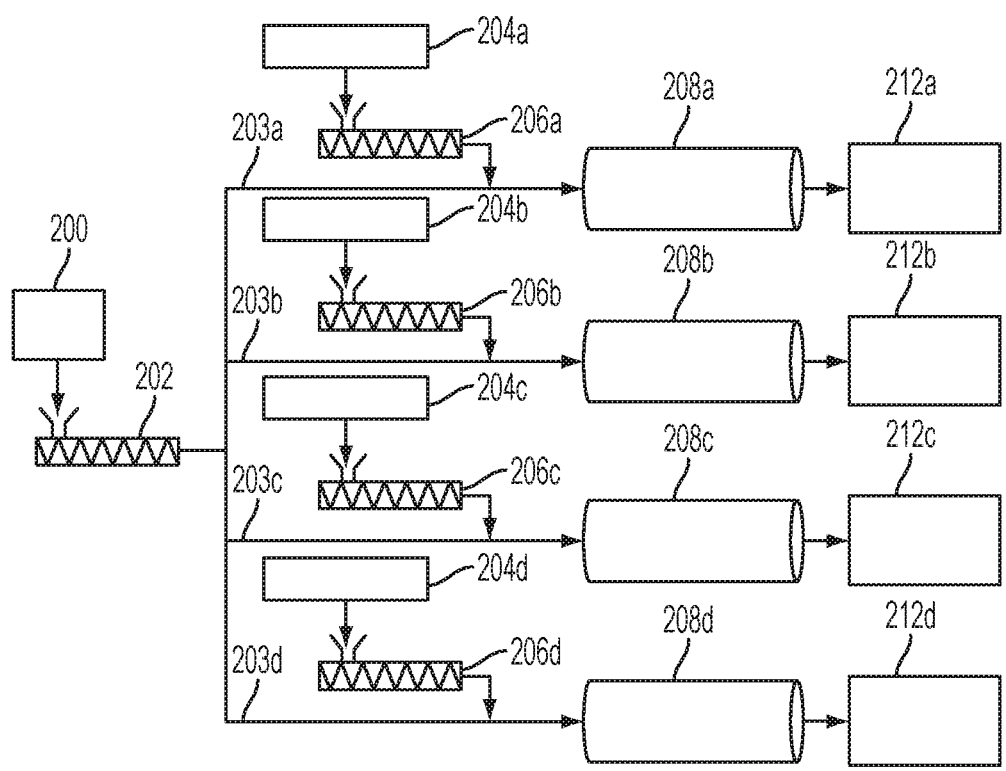
FIG. 11 depicts a process flow, according to a particular embodiment, for adding various colorants to several streams of molten polymer downstream from a first extruder.

Producing a Plurality of Different Colored Fibers Using a Single Primary Extruder In addition to the single colorant added to a single polymer stream from a primary extruder 202 described above with respect to FIG. 2, the process described herein may be utilized to produce a plurality of different colored filament from a single primary extruder. FIG. 11 depicts a process for producing a plurality of different colored filament from a single primary extruder (e.g., a single MRS extruder) according to a particular embodiment. As may be understood from FIG. 11, the process involves splitting the polymer melt from the primary extruder 202 into a plurality of individual polymer streams 203a-d (e.g., four individual polymer streams) using any suitable technique. In other embodiments, the process may include splitting the polymer melt from the primary extruder 202 into any suitable number of individual polymer streams (e.g., two individual polymer streams, three individual polymer streams, four individual polymer streams, five individual polymer streams, six individual polymer streams, seven individual polymer streams, eight individual polymer streams, etc.)

As shown in this Figure, a colorant (e.g., Colorant A-D 204a-d wherein Colorant A is indicated as 204a, Colorant B is indicated as 204b, Colorant C is indicated as 204c and Colorant D is indicated as 204d) is added to each individual polymer stream, for example, using a respective extruder 206a-d as described above. For example, Colorant C 204 is added to individual polymer stream 203c using extruder 206c.

Once the respective Colorant A-D 204a-d has been added to the respective individual polymer stream 203a-d, each individual polymer stream 203a-d with added Colorant A-D 204a-d is substantially uniformly mixed using respective one or more static mixing assemblies 208a-d. For example, once Colorant D 204d has been added to individual polymer stream 203d, the resultant colorant/polymer mixture passes through the one or more static mixing assemblies 208d to mix the Colorant D 204d and individual polymer stream 203d (e.g., to substantial homogeneity). Following mixture by the one or more static mixing assemblies 208a-d, the resultant respective colored melt streams are spun into filament using respective spinning machines 212a-d.

In various embodiments, it may be important to monitor the output of the extruder to determine a throughput of each individual polymer stream 203a-d. In such embodiments, monitoring throughput may ensure that each individual polymer stream 203a-d has the proper color letdown ratio in order to add a proper amount of Colorant A-D 204a-d to achieve a desired color of bulked continuous filament.

As may be understood from FIG. 11, splitting extruded polymer from a primary extruder 202 into a plurality of polymer streams 203a-d prior to the addition of colorant may enable the production of a plurality of colored filament using a single primary extruder 202. Furthermore, by using a plurality of different colorants and extruders downstream of the primary extruder 202, the process may facilitate a reduction in waste when changing a colorant used. For example, when using a single extruder in which color is added upstream of the extruder, there is waste associated with changing over a color package in that the extruder must run sufficiently long between changes to ensure that all of the previous color has cleared the extruder (e.g., such that none of the previous color will remain and mix with the new color). In some embodiments, the wasted filament as a result of a switch in color may include up to several thousand pounds of filament (e.g., up to 4000 pounds). Using a smaller secondary extruder 206a-d to introduce colorant to the various individual polymer streams 203a-d downstream from the primary extruder 202 may reduce (e.g., substantially reduce) the amount of waste associated with a changeover of colorant (e.g., to below about 100 pounds per changeover).

Alternative Embodiments

Various embodiments of a process for producing various colored bulked continuous filament may include features that vary from or are in addition to those described above. Exemplary alternative embodiments are described below.

Addition of Liquid Colorant to Melt Stream Using Pump

Figure 12:
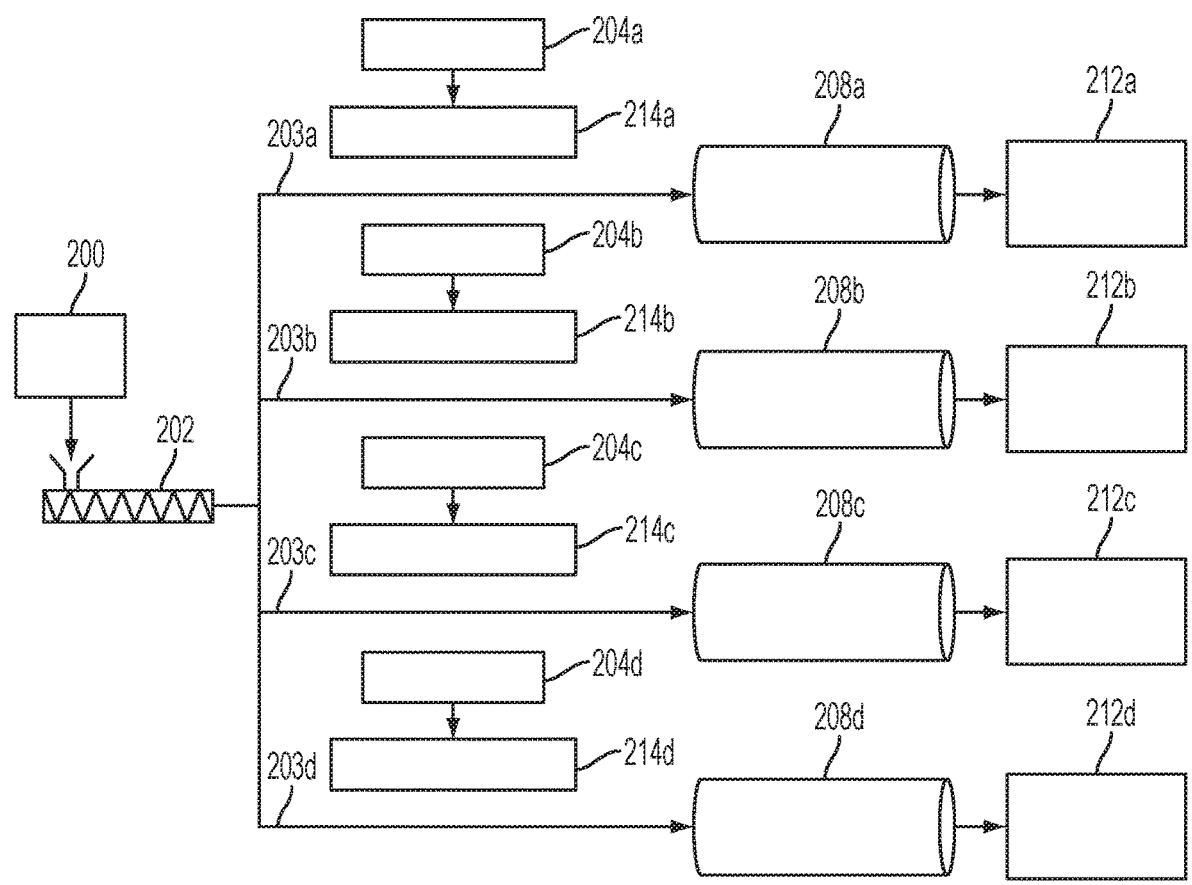
FIG. 12 depicts a process flow, according to another embodiment, for adding various colorants to several streams of molten polymer downstream from a first extruder.

FIG. 12 depicts an alternative process flow for that, in many respects is similar to the process flow shown in FIG. 11. In the embodiment shown in FIG. 12, however, liquid colorant 214a-d is added to the individual polymer streams 203a-d using a pump 214a-d rather than an extruder. In various embodiments, using a liquid colorant may have the benefit of additional cost saving due to not having to use any additional secondary extruders (e.g., which may have a greater initial cost outlay than a pump, greater running costs than a pump, etc.). In particular embodiments in which a pump 214a-d is used to inject the liquid colorant 214a-d into the individual polymer streams 203a-d, the process may further include exchanging a hose used to connect the pump 214a-d to the individual polymer streams 203a-d when exchanging a particular liquid colorant (e.g., liquid colorant 204a) for a different liquid colorant (e.g., a liquid colorant of a different color). By exchanging the hose when exchanging colorants, waste may further be reduced in that the replacement hose is pre-purged of any residual colorant of the previous color.

Conclusion

Many modifications and other embodiments of the invention will come to mind to one skilled in the art to which this invention pertains having the benefit of the teachings presented in the foregoing descriptions and the associated drawings. Also, while various embodiments are discussed above in regard to producing carpet filament from PET, similar techniques may be used to produce carpet filament from other polymers. Similarly, while various embodiments are discussed above in regard to producing carpet filament from PET, similar techniques may be used to produce other products from PET or other polymers.

In addition, it should be understood that various embodiments may omit any of the steps described above or add additional steps. Furthermore, any numerical ranges described herein are intended to capture every integer and fractional value within the described range (e.g., every rational number value within the described range). For example, it should be understood that a range describing a letdown ratio of between about two percent and about eight percent is intended to capture and disclose every rational number value percentage between two percent and eight percent (e.g., 2%, 3%, 4%, 5%, 6%, 7%, 8%, 2.1%, 2.01%, 2.001% . . . 7.999% and so on). Additionally, terms such as 'about', 'substantially', etc., when used to modify structural descriptions or numerical values are intended to capture the stated shape, value, etc. as well as account for slight variations as a result of, for example, manufacturing tolerances. For example, the term 'substantially rectangular' is intended to describe shapes that are both exactly rectangular (e.g., have four sides that meet at ninety degree angles) as well as shapes that are not quite exactly rectangular (e.g., shapes having four sides that meet at an angle in an acceptable tolerance of ninety degrees, such as 90°+/−4°)

In light of the above, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A system for manufacturing a bulked continuous carpet filament from polyethylene terephthalate (PET) having a tonal color, comprising:
   an extruder configured to at least partially melt the PET into a polymer melt and at least partially purify the polymer melt to create a polymer stream;
   a static mixing assembly positioned downstream of the extruder and fluidly coupled to the extruder to receive the polymer stream and to create a colored polymer stream, the static mixing assembly comprising:
      a housing,
      one or more individual static mixing elements disposed within the housing such that the polymer stream enters an upstream end of the static mixing assembly and exits a downstream end of the static mixing assembly, and
      a plurality of colorant ports along a length of the static mixing assembly from the upstream end to the downstream end such that each of the plurality of colorant ports is configured to provide colorant to the polymer stream at a different location along the length of the static mixing assembly, and wherein at least one of the plurality of colorant ports is configured to inject the colorant into the center of the polymer stream; and
   one or more spinning machines positioned downstream of the static mixing assembly and fluidly coupled to the static mixing assembly to receive the colored polymer stream, the one or more spinning machines configured to form the colored polymer stream into bulked continuous carpet filament having a tonal color effect.

2. The system according to claim 1, wherein the plurality of colorant ports comprises:
   a first colorant port positioned proximate to the upstream end of the static mixing assembly such that the colorant injected through the first colorant port is uniformly mixed over the length of the static mixing assembly to create a uniformly colored characteristic of the colored polymer stream; and
   a second colorant port positioned downstream of the first colorant port such that the colorant injected through the second colorant port mixes with the polymer stream for a distance shorter than the length of the static mixing assembly to create a tonal effect characteristic of the colored polymer stream.

3. The system according to claim 1, further comprising one or more colorant containers coupled to one or more of the plurality of colorant ports.

4. The system according to claim 3, wherein the one or more colorant containers are coupled to the one or more of the plurality of colorant ports via quick disconnect coupling mechanisms configured to allow for the installation and de-installation of a colorant container while the polymer stream traverses through the static mixing assembly.

5. The system according to claim 1, wherein the static mixing assembly comprises a plurality of static mixing assemblies, each of the plurality of static mixing assemblies receiving an individual polymer stream of a plurality of individual polymer streams split from the polymer stream downstream of the extruder.

6. The system according to claim 1, wherein one or more of the plurality of colorant ports are positioned to inject the colorant into the static mixing assembly two to four static mixing elements from the downstream end of the static mixing assembly.

7. The system according to claim 1, wherein one or more of the plurality of colorant ports are positioned to inject the colorant into the static mixing assembly at different positions around a circumference of the static mixing assembly.

8. The system according to claim 1, wherein all of the plurality of colorant ports are configured to inject the colorant into the center of the polymer stream.

9. A system for manufacturing a bulked continuous filament from polyethylene terephthalate (PET) having a tonal color, comprising:
   an extruder configured to at least partially melt the PET into a polymer melt and at least partially purify the polymer melt to create a polymer stream;
   a static mixing assembly positioned downstream of the extruder and fluidly coupled to the extruder to receive the polymer stream and to create a multi-colored polymer stream, the static mixing assembly comprising:
      a housing,
      one or more individual static mixing elements disposed within the housing such that the polymer stream enters an upstream end of the static mixing assembly and exits a downstream end of the static mixing assembly, and
      a plurality of colorant ports along a length of the static mixing assembly from the upstream end to the downstream end such that:
         a first colorant port of the plurality of colorant ports is configured to provide a colorant to the center of the polymer stream wherein the static mixing elements are configured to at least partially mix the colorant with the polymer stream to produce a colored polymer stream, and
         a second colorant port of the plurality of colorant ports is configured to provide the colorant to the colored polymer stream wherein the static mixing elements are configured to at least partially mix the second colorant with the polymer stream to produce a multi-colored polymer stream; and
   one or more spinning machines positioned downstream of the static mixing assembly and fluidly coupled to the static mixing assembly to receive the multi-colored polymer stream, the one or more spinning machines configured to form the multi-colored polymer stream into bulked continuous carpet filament.

10. The system according to claim 9, wherein:
    the first colorant port is positioned proximate to the upstream end of the static mixing assembly; and
    the second colorant port is positioned downstream of the first colorant port.

11. The system according to claim 9, wherein the static mixing assembly comprises a plurality of static mixing assemblies, each of the plurality of static mixing assemblies receiving an individual polymer stream of a plurality of individual polymer streams split from the polymer stream downstream of the extruder.

12. The system according to claim 9, wherein one or more of the plurality of colorant ports are positioned to inject the colorant into the static mixing assembly two to four static mixing elements from the downstream end of the static mixing assembly.

13. The system according to claim 9, wherein one or more of the plurality of colorant ports are positioned to inject the colorant into the static mixing assembly at different positions around a circumference of the static mixing assembly.

14. The system according to claim 9, wherein all of the plurality of colorant ports are configured to inject the colorant into the center of the polymer stream.

15. A system for manufacturing colored bulked continuous carpet filament from a polymer melt comprising polyethylene terephthalate (PET) using a first colorant comprising:
- an extruder configured to extrude the polymer melt into a static mixing assembly, wherein the static mixing assembly comprises:
  - an inlet and an outlet, wherein the inlet is fluidly connected to the extruder and the outlet is fluidly connected to at least one spin pack;
  - at least twenty static mixers located between the inlet and the outlet;
  - a first colorant port proximal the inlet and configured to inject the first colorant into the center of the polymer melt.

16. The system according to claim 15, wherein the static mixing assembly comprises a second colorant port located between the first colorant port and the outlet.

17. The system according to claim 16, wherein the second colorant port is positioned to inject the colorant into the static mixing assembly two to four static mixing elements from the outlet of the static mixing assembly.

18. The system according to claim 16, wherein the first and second colorant ports are positioned to inject the colorant into the static mixing assembly at different positions around a circumference of the static mixing assembly.

19. The system according to claim 16, wherein the second colorant port is configured to inject the colorant into the center of the polymer stream.

20. The system according to claim 15, wherein the static mixing assembly comprises a plurality of static mixing assemblies, each of the plurality of static mixing assemblies receiving an individual polymer stream of a plurality of individual polymer streams split from the polymer stream downstream of the extruder.

\* \* \* \* \*